US011532883B2

(12) United States Patent
Cohen et al.

(10) Patent No.: US 11,532,883 B2
(45) Date of Patent: Dec. 20, 2022

(54) BEAMFORMING TECHNIQUES IMPLEMENTING THE ITERATIVE ADAPTIVE APPROACH (IAA)

(71) Applicant: Intel Corporation, Santa Clara, CA (US)

(72) Inventors: Alon Cohen, Petach Tikva Ta (IL); Lior Maor, Petah Tikva M (IL); Moshe Teplitsky, Tel Aviv (IL); Ilia Yoffe, Ashdod (IL)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 16/725,396

(22) Filed: Dec. 23, 2019

(65) Prior Publication Data
US 2020/0136250 A1   Apr. 30, 2020

(51) Int. Cl.
*H01Q 3/26*   (2006.01)
*G01S 7/03*   (2006.01)
*H01Q 21/22*  (2006.01)

(52) U.S. Cl.
CPC ............ *H01Q 3/2694* (2013.01); *G01S 7/03* (2013.01); *H01Q 21/22* (2013.01)

(58) Field of Classification Search
CPC ........ H01Q 3/2694; H01Q 21/22; G01S 7/03
USPC ..................................... 342/81, 368, 357.25
See application file for complete search history.

(56) References Cited

U.S. PATENT DOCUMENTS

| 2016/0065290 A1* | 3/2016 | Zhu ................... H04W 72/0406 370/329 |
| 2017/0331670 A1* | 11/2017 | Parkvall ............... H04W 24/10 |
| 2020/0295817 A1* | 9/2020 | Loghin ................ H04B 7/0874 |

OTHER PUBLICATIONS

L. Du, T. Yardibi, J. Li and P. Stoica, "Review of user parameter-free robust adaptive beamforming algorithms," 2008 42nd Asilomar Conference on Signals, Systems and Computers, Pacific Grove, CA, 2008, pp. 363-367.
Luzhou Xu, Jian Li and P. Stoica, "Adaptive Techniques for MIMO Radar," Fourth IEEE Workshop on Sensor Array and Multichannel Processing, 2006., Waltham, MA, 2006, pp. 258-262.
T. Yardibi, J. Li, P. Stoica, M. Xue and A. B. Baggeroer, "Source Localization and Sensing: A Nonparametric Iterative Adaptive Approach Based on Weighted Least Squares," in IEEE Transactions on Aerospace and Electronic Systems, vol. 46, No. 1, pp. 425-443, Jan. 2010.

* cited by examiner

*Primary Examiner* — Bo Fan
(74) *Attorney, Agent, or Firm* — Banner & Witcoff Ltd.

(57) ABSTRACT

Techniques are disclosed implementing two alternative approaches for adaptive beamforming for MIMO radar. The first of these includes a "reduced complexity" iterative adaptive approach (RC-IAA) algorithm, which uses two steps including a delay-and-sum beamforming step (DAS-BF) and an IAA step that is applied to the output generated by the DAS-BF step. A second technique is described that includes a "beam space" iterative adaptive approach (BS-IAA) algorithm, which uses three steps including a delay-and-sum beamforming step (DAS-BF), a region of interest (ROI) detection step that is applied to the output generated by the DAS-BF, and an IAA step that is applied to detected ROIs.

20 Claims, 15 Drawing Sheets

BEAMFORMING TECHNIQUES IMPLEMENTING THE ITERATIVE ADAPTIVE APPROACH (IAA)

TECHNICAL FIELD

Aspects described herein generally relate to radar systems and, more particularly, to techniques implementing the iterative adaptive approach (IAA) for radar beamforming.

BACKGROUND

Radar systems often require antenna arrays that allow DoA (Direction of Arrival) estimation to be performed. Approaches to performing DoA estimation algorithms typically fall into two categories: classic and adaptive. The classic approach implements a low complexity and low resolution solution, whereas the adaptive approach implements a high complexity and high resolution solution. Each of these techniques has significant drawbacks.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1A:
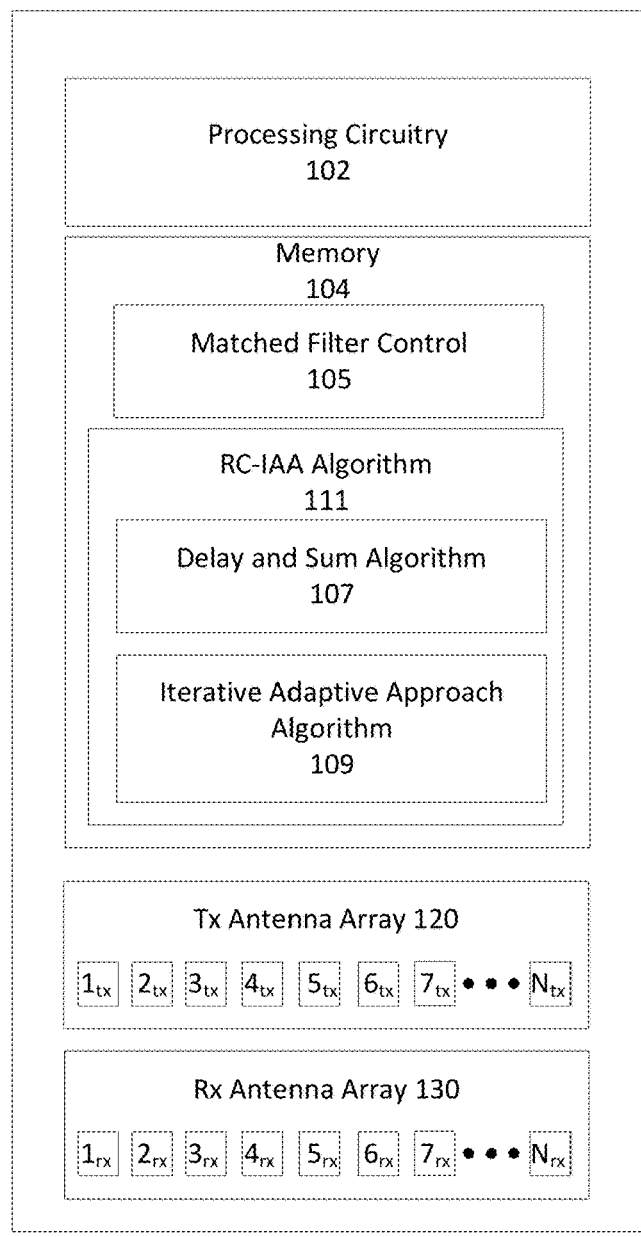
FIG. 1A illustrates a block diagram of an exemplary MIMO radar device, in accordance with an aspect of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Multiple-input multiple-output (MIMO) radar is an advanced type of phased array radar implementing digital receivers and waveform generators distributed across an aperture. MIMO radar signals propagate using closely-spaced antennas within an array to obtain better spatial resolution, Doppler resolution, and dynamic range. In a traditional phased array MIMO radar systems, additional antennas and related hardware are needed to improve spatial resolution. To accomplish this, traditional MIMO radar systems transmit mutually orthogonal signals from multiple transmit antennas (denoted as Ntx), and these waveforms are then extracted from each of the receive antennas (Nrx) using a set of matched filters. For example, if a MIMO radar system has 3 transmit antennas and 4 receive antennas, 12 signals can be extracted from the receiver because of the orthogonality of the transmitted signals. That is, a 12-element "virtual" antenna array is created using only 7 antennas by performing digital signal processing on the received signals, thereby obtaining a finer spatial resolution compared with its phased array counterpart.

Beamforming is used within a MIMO radar system as part of a Direction of Arrival (DoA) algorithm to dynamically identify the DoA for radar signals. But, as mentioned above, both classic and adaptive DoA estimation algorithms have drawbacks. In particular, classic beamforming approaches lack the spatial resolution required for certain applications, such as autonomous driving radar systems for instance. Therefore, adaptive beamforming systems attempt to address the shortcomings of the classic beamforming solutions, but do so by introducing a significant amount of complexity to achieve a higher spatial resolution, which in turn requires significant processing power and added system cost.

More specifically, classic beamforming systems generally rely upon delay-and-sum (DAS) beamforming techniques to offer a low-complexity and low resolution solution by implementing a spatial filter with constant coefficients. The filter coefficients are derived based on a desired filter pattern (spatial frequency response). Adaptive beamforming, on the other hand, functions as a high-complexity and high resolution beamforming solution by operating at the virtual array output, which again has dimensions equal to the number of transmit antennas multiplied by the number of receive antennas. Such "full virtual array" adaptive beamforming solutions function to adjust the filter response based on received signal statistics, with the goal of the adjustment being a minimization of some criterion. For instance, for MVDR (Minimum Variance Distortionless Response), the goal is a minimization of the beamforming output power under the constraint of unity gain in a desired direction.

However, because practical MIMO radar systems typically implement a large number of antennas (e.g., 30 or more receive and transmit antennas), the size of the virtual array may represent tens up to thousands of virtual channels. Thus, because adaptive beamforming algorithms use the entire virtual array as part of the calculations, as discussed in further detail below, the calculations involving these virtual arrays (e.g. the inversion of large matrices that the virtual array may represent) is very computationally demanding and a numerically unstable operation.

Further to this point, current adaptive beamforming (BF) algorithms may be known as "super resolution algorithms," and are conventionally used to achieve the high spatial resolution required for radar applications, but are limited in two aspects. First, adaptive beamforming requires that signal processing be implemented to perform an estimation of the covariance (COV) matrix of received signals, and to provide an accurate estimation of the COV matrix, many signal "snapshots" are required. However, in practical applications, the number of snapshots is often limited and, in some cases, only a single snapshot is available. The estimation of the COV matrix with such a low number of snapshots yields an ill-conditioned COV matrix, which can cause errors and degrade system performance. Second, an inversion of the COV matrix is required as part of the adaptive beamforming algorithm, and this calculation is a highly complex operation. Further complicating this issue, if the COV matrix is also an ill-conditioned matrix, such a matrix inversion calculation is a numerically unstable operation.

Therefore, to address these issues, the aspects described herein implement two alternative approaches for adaptive beamforming for MIMO radar. The first of these includes what is referred to herein as a "reduced complexity" iterative adaptive approach (RC-IAA) algorithm, which is described in further detail in Section 1 of the present disclosure, and is directed to FIGS. 1-5. The second of these includes what is referred to herein as a "beam space" iterative adaptive approach (BS-IAA) algorithm, which is described in further detail in Section 2 of the present disclosure, and is directed to FIGS. 6-11.

Section 1—Reduced Complexity Iterative Adaptive Approach (RC-IAA) Algorithm for Beamforming The RC-IAA algorithm discussed in this Section is implemented by using a COV matrix having a reduced size having dimensions of Nrx×Nrx. Again, to perform full virtual array processing, the COV matrix size used for conventional adaptive beamforming algorithms has dimensions of NrxNtx×NrxNtx. This size reduction significantly reduces the computation complexity of adaptive beamforming. In addition, the aspects described herein are also based upon an iterative adaptive approach (IAA) for COV matrix estimation, which estimates a well-conditioned COV matrix even from a single snapshot.

As further discussed below, the aspects described herein implement an adaptive beamforming algorithm using a two-step process. In a first step, conventional delay and sum (DAS) beamforming is applied on matched filter outputs that are received from the same RX antenna. The number of outputs of the DAS beamformers is thus equal to the number of the RX antennas (Nrx). Then, as a second step, adaptive beamforming (e.g. Capon or amplitude and phase estimation of a sinusoid (APES)) is applied to the Nrx outputs from the first step. The main advantage of this approach is that adaptive beamforming is applied to an array of size Nrx instead of Nrx×Ntx, as is the case for a virtual array. As a result, issues related to COV matrix estimation and the calculations associated with COV matrix inversion become less critical. Although this approach results in some loss in degrees of freedom (i.e. number of nulls) in the adaptive beamformer, this tradeoff is acceptable given the processing advantages gained as a result of the reduction in size in the virtual array.

Conventional methods for implementing adaptive beamforming algorithms also include a two-step approach that use Capon or, alternatively, APES as a second step. But to obtain a well-conditioned COV matrix, a number of snapshots L is required to satisfy the condition L>Nrx. But again, as noted above, often only a single snapshot is available. Moreover, the aspects described herein utilize a single snapshot because the range and Doppler processing (which is a type of matched filer) is applied before the beamforming is performed. Therefore, the aspects as further described herein obtain a single virtual array output (single snapshot) for each range-Doppler bin. Conventional two-step approaches are not capable of performing adaptive beamforming using a single snapshot in this way.

FIG. 1A illustrates a block diagram of an exemplary MIMO radar device, in accordance with an aspect of the disclosure. The MIMO radar device 100 may be implemented as a standalone device or a component that is used for any suitable type of radar application. For instance, the MIMO radar device 100 may be implemented as part of an automobile or other device that identifies a location (i.e. range and direction) of targets via the aspects described herein.

In an aspect, the MIMO radar device 100 may include processing circuitry 102, a memory 104, a transmit antenna array 120 including any suitable number Ntx of transmit antennas and a receive antenna array 130 including any suitable number Nrx or receive antennas. The components shown in FIG. 1A are provided for ease of explanation, and aspects include device 100 implementing additional, less, or alternative components as those shown in FIG. 1A. For example, the MIMO radar device 100 may include one or more power sources, display interfaces, peripheral devices, ports, transceivers, etc. To provide additional examples, the MIMO radar device 100 may further implement any suitable number of matched filters and delay and sum (DAS) circuitry, as further discussed with reference to FIG. 1B.

In an aspect, the various components of the MIMO radar device 100 may be identified with functionality further described herein with reference to the example block diagram 150 as shown and described with reference to FIG. 1B. For example, the MIMO radar device 100 may execute an adaptive beamforming algorithm as further discussed herein to identify DoA of radar signals and to process received radar signals to determine the range and direction to one or more detected targets in a field of view. To do so, the MIMO radar device 100 may be configured to transmit radar signals via each of the transmit antennas included in the transmit antenna array 120, which may be in accordance with any suitable protocol, frequency, and/or band of frequencies (e.g., mm-Wave frequency bands). Moreover, the transmitted radar signals may reflect off of one or more targets, and these signal reflections may be received by each of the receive antennas included in the receive antenna array 130. These received reflections may then be further processed in accordance with the adaptive beamforming algorithm as discussed herein to identify the range and DoA of the targets from which the signals were reflected.

As referenced further in this and the other Sections, the term "mm-Wave frequency," which the aspects described in this Section as well as others may operate, may include, for example, frequencies and frequency bands above 20 GHz, 24 GHz, 28 GHz, etc., up to an upper frequency. For instance, mm-Wave frequency bands may include frequencies ranging from 20 GHz to 300 GHz, from 24 GHz to 300 GHz, etc. This may include, for instance, the various bands known to be associated with or otherwise referred to as mm-Wave frequency bands such as 24 GHz, 28 GHz, 37 GHz, 39 GHz, 40 GHz, 47 GHz, 60 GHz, etc.

To do so, processing circuitry 102 may be configured as any suitable number and/or type of computer processors, which may function to control the MIMO radar device 100 as discussed herein. Processing circuitry 102 may be identified with one or more processors (or suitable portions thereof) implemented by the MIMO radar device 100. As discussed herein, processing circuitry 102 may, for example, be identified with one or more processors implemented by the MIMO radar device 100 such as a host processor, a digital signal processor, one or more microprocessors, microcontrollers, an application-specific integrated circuit (ASIC), part (or the entirety of) a field-programmable gate array (FPGA), etc. In any event, aspects include the processing circuitry 102 being configured to carry out instructions to perform arithmetical, logical, and/or input/output (I/O) operations, and/or to control the operation of one or more components of the MIMO radar device 100 to perform various functions associated with the aspects as described herein.

For example, the processing circuitry 102 can include one or more microprocessor cores, memory registers, buffers, clocks, etc., and may generate electronic control signals associated with electronic components to control, tune, and/or modify the operation of one or more components of the MIMO radar device 100 as discussed herein. Moreover, aspects include processing circuitry 102 communicating with and/or controlling functions associated with the memory 104 and/or other components of the MIMO radar device 100. This may include, for example, conditioning signals prior to transmission via the transmit antenna array 120 and processing the reflected radar signals received via the receive antenna array 130.

In an aspect, the memory 104 stores data and/or instructions such that, when the instructions are executed by the processing circuitry 102, the processing circuitry 102 performs various functions as described herein. The memory 104 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 104 can be non-removable, removable, or a combination of both.

For example, the memory 104 may be implemented as a non-transitory computer readable medium storing one or more executable instructions such as, for example, logic, algorithms, code, etc. As further discussed below, the instructions, logic, code, etc., stored in the memory 104 are represented by the various modules as shown in FIG. 1A, which may enable the aspects disclosed herein to be functionally realized. Alternatively, if the aspects described herein are implemented via hardware, the modules shown in FIG. 1A associated with the memory 104 may include instructions and/or code to facilitate control and/or monitor the operation of such hardware components. In other words, the modules shown in FIG. 1A are provided for ease of explanation regarding the functional association between hardware and software components. Thus, aspects include the processing circuitry 102 executing the instructions stored in these respective modules in conjunction with one or more hardware components to perform the various functions associated with the aspects as further discussed herein.

In an aspect, the executable instructions stored in matched filter control circuitry 105 may facilitate, in conjunction with the processing circuitry 102, the correlation of a known delayed signal, or template, with an unknown signal to detect the presence of the template in the unknown signal. This known signal may be transmitted as part of the radar signals transmitted via the transmit array 120, for example. Thus, the matched filter control circuitry 105 may function to detect known signals as part of one or more radar signal processing operations. For instance, the matched filter control circuitry may detect known signals received via the receive antenna array 130 in accordance with any suitable techniques, including known techniques, that may be performed as part of known radar system processing operations. This may include, for instance, the use of pulse compression or other matched filtering to exploit the Doppler effect to identify moving targets and/or the range to identified targets. The functionality of matched filters is generally understood with respect to radar signal processing operations, and thus the operation of the matched filter control circuitry 105 is not further described in detail herein.

Figure 1B:
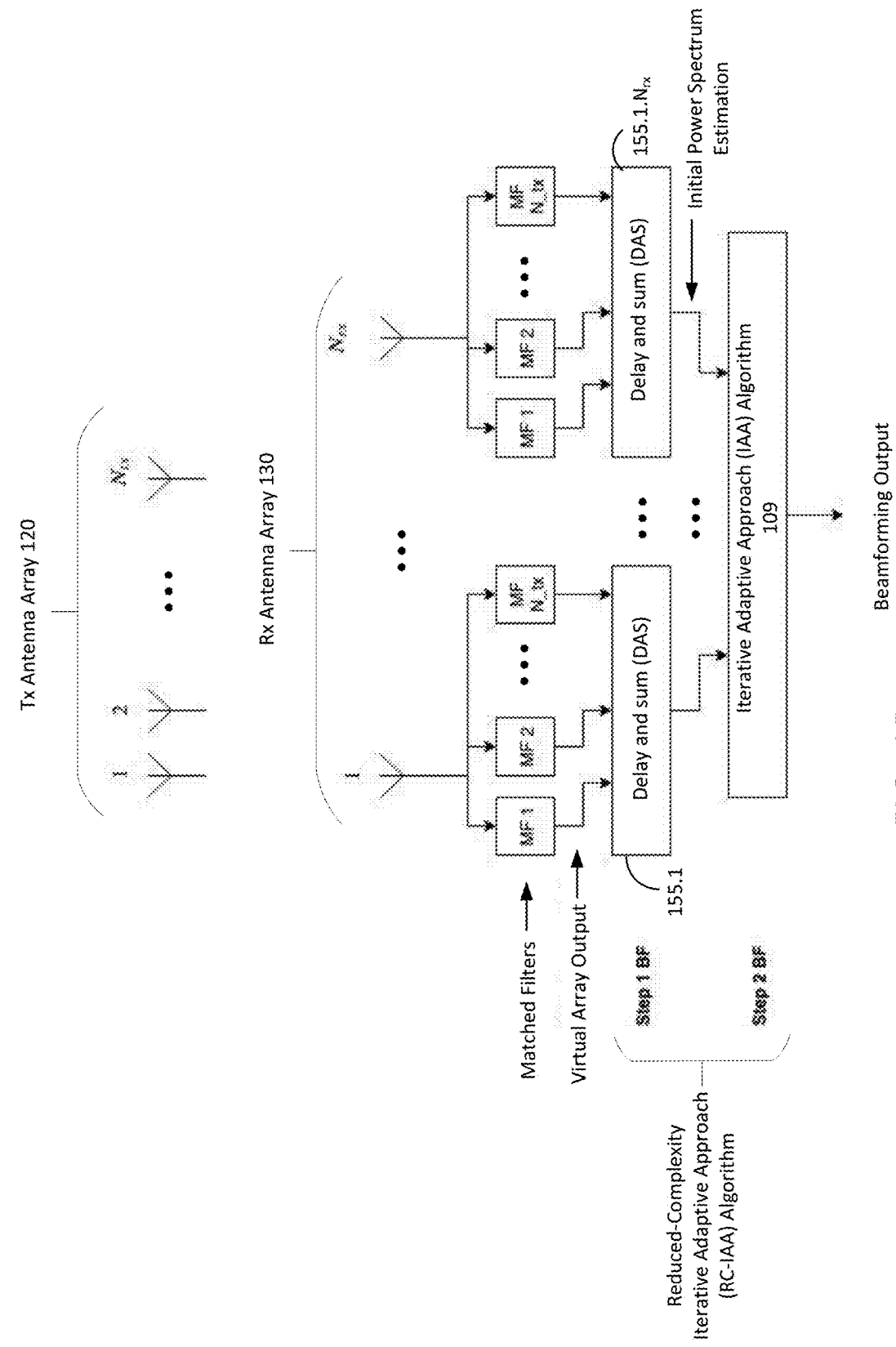
FIG. 1B illustrates a block diagram showing additional detail and processing flow associated with the MIMO radar device of FIG. 1A, in accordance with an aspect of the disclosure.

Referring now to FIG. 1B, which illustrates a block diagram 150 of an example adaptive beamforming technique in accordance with an aspect of the disclosure, aspects include the MIMO radar device 100 including a number of matched filters (denoted MF 1, MF 2, etc.) coupled to each antenna within the receive antenna array 130. The block diagram 150 is for illustrative purposes, and thus any additional connections between the various components such as filters, amplifiers, etc., is not shown for purposes of brevity and clarity. The matched filters may have any suitable architecture and configuration to detect known signals received via each antenna, as noted above. In an aspect, the matched filters may be tuned, controlled, monitored, and/or each respective received signal processed via the matched filter control circuitry 105, which may be implemented as a software-based solution, a hardware-based solution, or a combination of both software and hardware-based solutions, in various aspects.

As shown in FIG. 1B, each receive antenna within the receive antenna array 130 is coupled to a number of matched filters equal to the number Ntx of transmit antennas within the transmit antenna array 120. Therefore, the overall number of matched filters is equal to the size of the virtual array, which is (Ntx×Nrx) as shown in FIG. 1B. In other words, the virtual array output is represented as the signal output from each matched filter. As an example that will be used further below, it is assumed that the number of transmit antennas Ntx is 6, and the number of receive antennas Nrx is 16. Therefore, in this example there are a total of 96 matched filters, each providing an output that forms part of the 96 element virtual array. Of course, this is but one example, and the aspects described herein are not limited in this regard and may include any suitable number of transmit and receive antennas Ntx and Nrx, respectively.

As discussed above, traditional adaptive beamforming systems utilize the entire virtual array as part of a full virtual array processing, which is significantly complex and is processor intensive given the large virtual array size. In contrast to this approach, the aspects described herein advantageously utilize a lower complexity two-step approach. A summary of the algorithm including both of these steps is shown in Tables 2A-2B and further discussed below. As part of this approach, the first step includes the use of a number of delay and sum (DAS) circuitry blocks equal to the number Nrx of receive antennas. Thus, in the example block diagram 150, the MIMO radar device 100 includes DAS circuitry blocks 155.1-155. Nrx, with each DAS circuitry block 155 being coupled to the outputs of the set of matched filters associated with each receive antenna within the receive antenna array 130 as shown in FIG. 1B.

The DAS circuitry blocks 155.1-155.Nrx may be implemented with any suitable type of hardware components configured to time-align the outputs of each of the matched filters. These component may include, for instance, any suitable type of delay elements, summer circuits, correlators, etc., that ensure the outputs of each matched filter are substantially time-aligned with one another and summed together to constructively add as part of a beamforming operation. The DAS circuitry blocks 155.1-155.Nrx may be implemented in accordance with nay suitable technique to achieve this functionality, including techniques known to be utilized for such operations in accordance with beamforming systems. In an aspect, the DAS circuitry blocks 155.1-155.Nrx may be tuned, controlled, monitored, and/or each respective received signal processed via the delay and sum algorithm 107 as shown in FIG. 1A, which may work in conjunction with processing circuitry 102 to do so. In various aspects, the delay and sum algorithm 107 may be implemented as a software-based solution, a hardware-based solution, or a combination of both software and hardware-based solutions.

In an aspect, the outputs provided by the DAS circuitry blocks 155.1-155.Nrx constitute an initial power spectrum estimation for the radar signals received via the receive antenna array 130. Thus, the DAS circuitry blocks 155.1-155.Nrx function to distill the initial size of the virtual array, which is conventionally used for adaptive beamforming algorithms and has a size of NtxxNrx, to an initial power spectrum estimation having a size equal to the number of receive antennas Nrx.

In an aspect, the reduced-complexity iterative adaptive approach (RC-IAA) algorithm, which is shown in further detail below in Tables 2A-2B, is implemented as a combination of the two steps described herein. Thus, aspects include the RC-IAA algorithm being performed via execution of instructions stored in the RC-IAA algorithm module 111 by the processing circuitry 102 as shown in FIG. 1A, which includes execution of the delay and sum algorithm module 107 (step 1) and the execution of the IAA algorithm circuitry block 109 (step 2). Again, the first step described above is performed by the DAS circuitry blocks 155.1-155.Nrx and provides an initial power spectrum estimation having a size equal to the number of receive antennas Nrx.

Thus, the aspects of the RC-IAA algorithm as described implements two steps. In a first step, as shown and described in further detail below with reference to Table 2A, an initial DAS spectrum estimation is performed using a DAS beamforming algorithm.

Then, in a second step, which is shown and described in greater detail with respect to Table 2B below, an algorithm is implemented in accordance with what is known as the iterative adaptive approach (IAA), which operates on the aforementioned initial power spectrum estimation. Table 1 below provides a general form of the IAA algorithm. The IAA is a known spectral estimation technique that is based on a weighted least squares minimization. However, the aspects described herein are not limited to this particular implementation of the IAA technique, and other variations may be implemented without departing from the spirit and scope of the disclosure.

TABLE 1 a general form of the IAA algorithm $$\hat{s}_k(n) = \frac{a_k^* y(n)}{M}, n = 1, \ldots N, k = 1, \ldots, K$$

$$\hat{P}_k = \frac{1}{N} \sum_{n=1}^{N} |\hat{s}_k(n)|^2, k = 1, \ldots, K$$

repeat
$\bar{R} = A(\theta)\hat{P}A^*(\theta)$
For k = 1, . . . , K $$w_k = \frac{\bar{R}^{-1} a_k}{a_k^* \bar{R}^{-1} a_k}$$

$\hat{P}_k = w_k^* \bar{R} w_k$
end for
until (convergence)

Now turning to Table 2B and the second step of the RC-IAA algorithm, the initial power spectrum estimation obtained in the first step (DAS beamforming—Table 2A) is represented as the virtual steering matrix A. In an aspect, the second step of the RC-IAA algorithm operates on this virtual steering matrix A in accordance with an application of the iterative adaptive approach (IAA).

With respect to the Table 2A below, the RC-IAA algorithm uses the following notations:

Spectrum grid: $\{\theta_i\}_0^{N_{grid}-1}$

TX steering vector: $a_t(\theta_i)$

RX steering vector: $a_r(\theta_i)$

Window for spectral estimation: w

Power in direction $\theta_i$: $p_i$

Again, as shown in Table 2A below, the first step includes an initial DAS spectrum estimation that defines an initial TX steering vector $a_{t_i}$, an initial receive steering vector $a_{r_i}$, an initial virtual steering vector $a_{v_i}$, a DAS power estimation with windowing defined as $p_i$, and an operation associated with building a virtual steering matrix A(:, i). Furthermore, to demonstrate the level of complexity of the RC-IAA algorithm aspects described herein, several example parameters are shown that result in a measured complexity in terms of MAC.

TABLE 2A

| Algorithm | Comments | Complexity (in MAC) |
|---|---|---|
| Notations and inits | | $N_{tx} = 6$ |
| Spectrum grid $\{\theta_i\}_0^{N_{grid}-1}$ | | $N_{rx} = 16$ |
| TX steering vector $a_t(\theta_i)$ | | $N_{virt} = 96$ |
| RX steering vector $a_r(\theta_i)$ | | $N_{grid} = 200$ – number |
| Window for spectral estimation: w | | of sample of |
| Power in direction $\theta_i$: $p_i$ | | the spectrum |
| | | $iter_{num} = 5$ |
| | | Complex * complex = |
| | | 4 mult |
| | | Real * complex = |
| | | 2 mult |

TABLE 2A-continued

| Algorithm | Comments | Complexity (in MAC) |
|---|---|---|
| DAS spectrum estimation<br>for i = 1: $N_{grid}$<br>$a_{t_i} = a_t(\theta_i)$<br>$a_{r_i} = a_r(\theta_i)$<br>$a_{v_i} = \text{vec}(a_{r_i} a_{t_i}^T)$<br>$p_i = a_{v_i}^H \text{diag}(w) R_{yy} \text{diag}(w) a_{v_i}$<br>$A(:, i) = a_{v_i}$<br>end | | $4 * N_{virt} * N_{virt}/2 =$<br>20K |
| | | Loop total = $N_{grid} *$<br>20K = 4M |

TABLE 2B

| IAA iterations<br>for i = 1: iter_num | | $aa^H$ computed beforehand, p is real |
|---|---|---|
| $R_{iaa} = A \text{ diag}(p) A^H$ | | $2 \dfrac{N_{rx}^2}{2} N_{grid} = 51K$ |
| $R_{iaa}^{-1} = \text{inv}(R_{iaa})$ | | $4 \dfrac{N_{virt}^3}{2} = 8K$ |
| | | $Ya_{t_j}^* a_{t_j} Y^H$ is computed in step 1 -<br>DAS spectrum estimation<br>$R_{iaa}^{-1} Ya_{t_j}^* a_{t_j} Y^H R_{iaa}^{-1}$ is computed<br>one time, out of the loop $\dfrac{4(N_{rx})^3}{2} = 8K$ |
| for j = 1: $N_{grid}$ | Loop on<br>thetas grid | |
| $p_j = \dfrac{a_{r_j}^H R_{iaa}^{-1} Y a_{t_j}^* a_{t_j} Y^H R_{iaa}^{-1} a_{r_j}}{\left(a_{r_j}^H R_{iaa}^{-1} a_{r_j}\right)^2 M^2}$ | Update of<br>the power | $N_{grid} *$ 2(numerator and denominator) *<br>$2(\text{real}) * \dfrac{N_{rx}^2}{2} = 102K$ |
| end<br>end | | Loop total = 170K * 5 ~ 0.85M |

As shown in further detail in Table 2B above, the IAA covariance (COV) matrix estimation is represented as $R_{iaa}$, whereas the inverse of the IAA covariance matrix estimation is represented as $R_{iaa}^{-1}$. In an aspect, the inverse of the COV matrix estimation may be calculated using Cholesky decomposition, although this is by way of example and not limitation, and any suitable techniques may be implemented to calculate the inverse of the covariance matrix estimation $R_{iaa}^{-1}$, in accordance with various aspects. Thus, this portion of the IAA algorithm forms an "outer loop" in which a number of iterations are performed with respect to the calculations of the power estimation of the virtual steering matrix A (5 in this example as $\text{iter}_{num}$=5).

In an aspect, the IAA algorithm operates using a second "inner loop" that is nested within the outer loop as noted above. In this inner nested loop, the power in a direction as defined by $\theta_i$ is iteratively calculated for each i value until a maximum number of spectrum samples is reached (200 in this example as Ngrid=200). Thus, the IAA algorithm functions to iteratively update and evaluate the power over a number of samples for each iteration of a different direction $\theta_i$ until an appropriate weighted beamforming combination is calculated. This weighted beamforming combination is then output as shown in FIG. 2B as beamforming output signals and/or data. In an aspect, the signals and/or data associated with the beamforming output (e.g., weights and phases) may then be used to identify the DoA for a set of received radar signals. For example, the beamforming output may be correlated to stored data (e.g. in a LUT) to derive a beam pattern from the beamforming output, from which the DoA may be calculated.

In other words, by implementing the IAA technique in the second step of the RC-IAA algorithm as described above, the COV matrix is estimated iteratively, when it is modeled as $R=A \text{diag}(p) A^H$ (see line 4 in Table 1), where A is a matrix of the steering vectors and P=diag(p) is a diagonal matrix of powers from all angles of arrival (AoA) (i.e. a spectrum estimation). Once the COV matrix is estimated, the power spectrum in the inner loop is estimated (see lines 5-8 in Table 1). Then, once a better spectrum estimation is obtained, the COV matrix is estimated again, and so on. Again, aspects include the initial spectrum estimation as shown in Table 1, lines 1-2, being calculated via the DAS beamforming algorithm as shown in FIG. 1B.

Thus, using the example values as shown in Tables 2A-2B above, an overall complexity value in terms of MAC is calculated for the overall RC-IAA algorithm of approximately 5 M. The complexity and performance of the RC-IAA algorithm is shown in further detail below in Table 3 compared to other conventional techniques to calculate beamforming data.

TABLE 3

| Algorithm | Complexity [MAC] | Comments |
|---|---|---|
| DAS virtual array | 4M | Complexity analysis is shown in Table 2A |
| IAA virtual array | 55M | The most computationally demanding operations are estimation and inversion of the COV matrix. |
| RC-IAA | 5M | Complexity analysis is shown in Tables 2A-2B. |

The first algorithm listed is the DAS BF applied to the entire virtual array as shown in FIG. 2B. This algorithm may be used to calculate beamforming data in a non-adaptive or static manner. To reduce side lobes of the spatial filter, a windowing function is generally applied, which is simulated in this example using a Chebyshev window (−60 db). This DAS BF algorithm is also used in the first part of the RC-IAA algorithm as summarized in Table 2A above. As shown by Tables 2A and 3, this has the lowest complexity of 4 M, but is also non-adaptive.

The second algorithm in Table 3 above is an IAA algorithm applied to the entire virtual array as shown in FIG. 2B. Although this algorithm allows for adaptive beamforming calculations, this requires a significant amount of complexity (55M) given the use of the large element virtual array as noted herein.

The third algorithm is the RC-IAA to which the aspects of the present disclosure are directed, which is summarized in Tables 2A and 2B above along with a corresponding complexity analysis in the right-hand column. As can be seen from the results of the complexity analysis, the RC-IAA only introduces a slight amount of complexity compared to non-adaptive solutions to achieve an adaptable beamforming solution (5M vs 4M) and is significantly less complex compared to the IAA virtual array solution (5M vs 55M).

Figure 2:
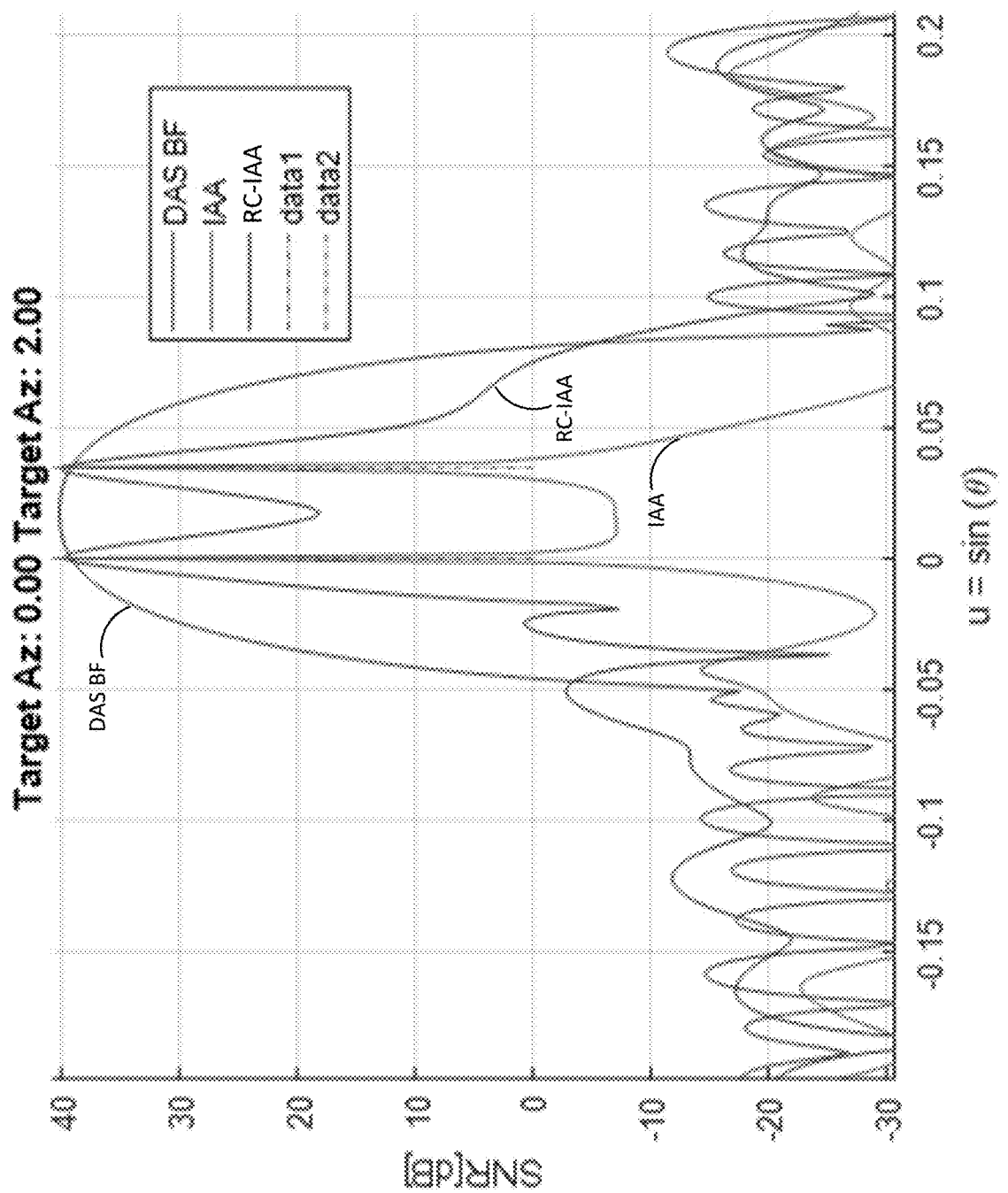
FIG. 2 illustrates a SNR vs. azimuth angle graph for two targets corresponding to different beamforming algorithms, in accordance with an aspect of the disclosure.
Figure 3:
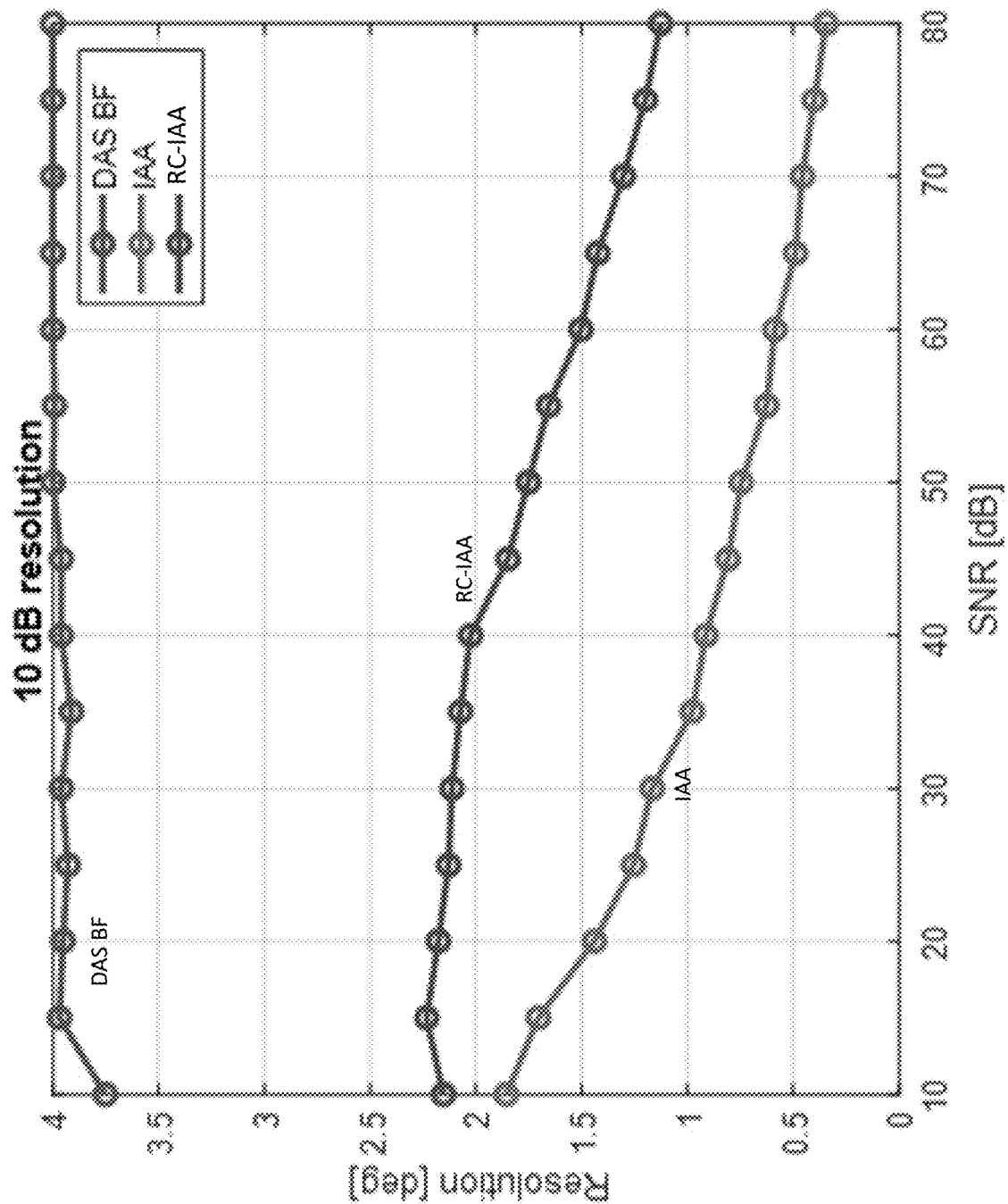
FIG. 3 illustrates a resolution vs. SNR graph corresponding to different beamforming algorithms, in accordance with an aspect of the disclosure.
Figure 4:
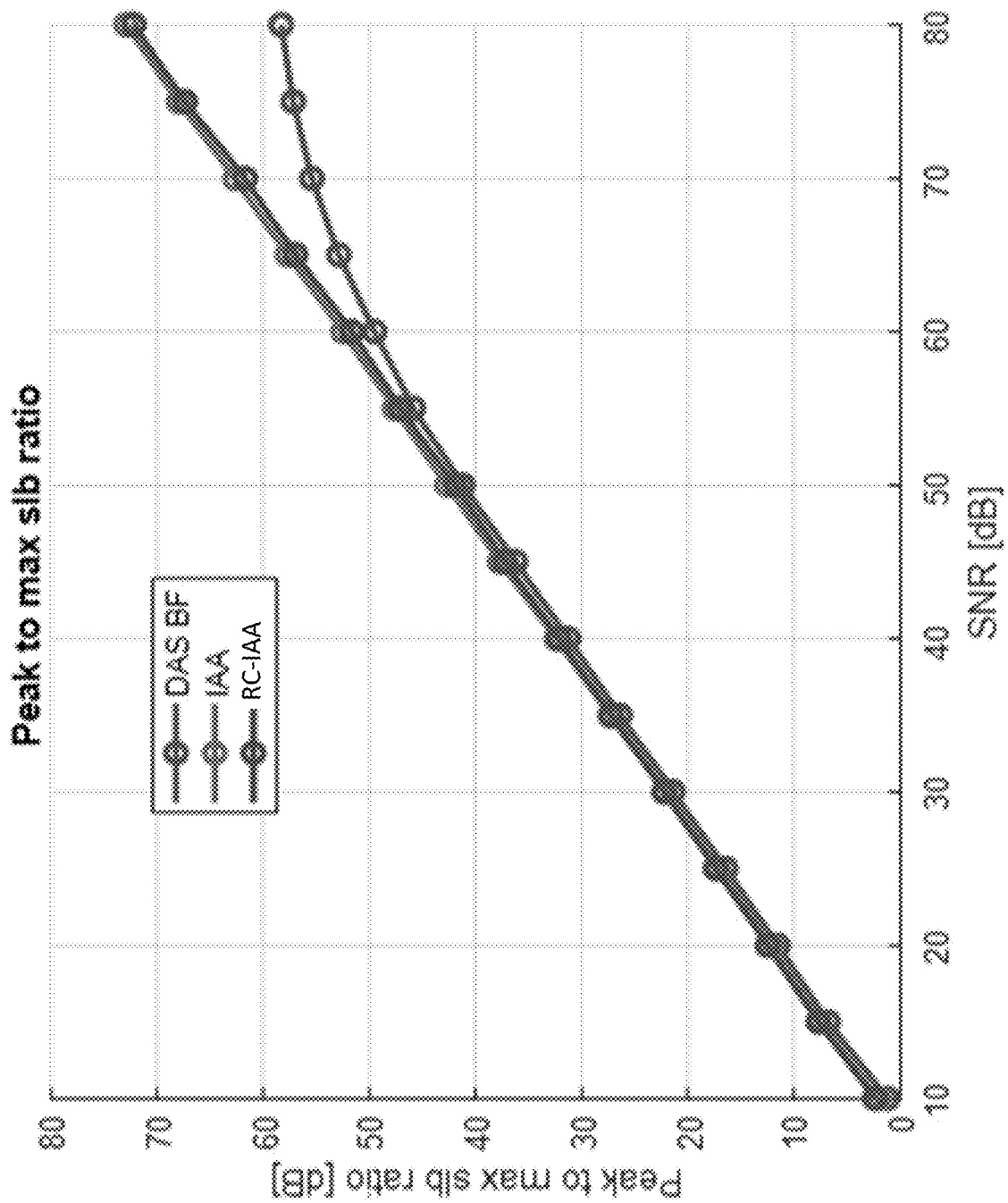
FIG. 4 illustrates peak to maximum side lobe power ratio vs. SNR graph corresponding to different beamforming algorithms, in accordance with an aspect of the disclosure.

FIGS. 2-4 provide graphs that compare various metrics of performance of the different algorithms shown in Table 2. For example, FIG. 2 illustrates a SNR vs. azimuth angle graph for two targets corresponding to different beamforming algorithms, in accordance with an aspect of the disclosure. The graph shown in FIG. 2 depicts a spatial spectrum for two targets with an azimuth space of 2 degrees. As can be seen from this comparison, the RC-IAA algorithm has adequate spatial resolution to identify the DoA for the targets positioned two degrees apart despite the reduced complexity compared to the full virtual array IAA algorithm. Note that the non-adaptive DAS beamforming algorithm lacks the spatial resolution to differentiate between these two different targets even though the complexity of the DAS beamforming algorithm and the RC-IAA algorithm are similar as noted above.

FIG. 3 illustrates a resolution vs. SNR graph corresponding to different beamforming algorithms, in accordance with an aspect of the disclosure. Again, data is provided for each separate algorithm as shown in Table 2 above. The resolution is defined in this example as a minimal spacing between the targets such that a difference of −10 dB is observed between them. As can be seen from FIG. 3, the RC-IAA algorithm sacrifices at most a degree of resolution across a band of 70 dB of SNR compared to the full virtual array IAA algorithm, despite a significant reduction in complexity.

FIG. 4 illustrates a peaks to side lobe power vs. SNR graph corresponding to different beamforming algorithms, in accordance with an aspect of the disclosure. With reference to the graph shown in FIG. 3, the average ratio between the peak power to the maximal power of the side lobes is graphed as function of SNR. From FIG. 4 it can be seen that the peak-to-sidelobe ratio is limited to 60 dB for the non-adaptive DAS beamforming algorithm. This performance limit is a result of the sidelobes associated with the Chebyshev window, which is a 60 dB window in this example. The RC-IAA algorithm provides a robust solution, however, that nearly tracks the performance of the full virtual array IAA algorithm.

In summary, the aspects described in this Section provide super resolution spectrum estimation similar to IAA techniques applied to the entire virtual array. The resolution of the adaptive beamforming solution achieved via the RC-IAA algorithm is significantly better than the non-adaptive DAS beamforming solutions as shown by the graphs in FIGS. 2-4 and discussed elsewhere herein. Furthermore, the application of the RC-IAA algorithm only requires a small increase in complexity compared to the DAS beamforming algorithm, whereas IAA techniques applied to the entire virtual array suffer from very high complexity (more than ten times that of the described RC-IAA algorithm aspects).

Figure 5:
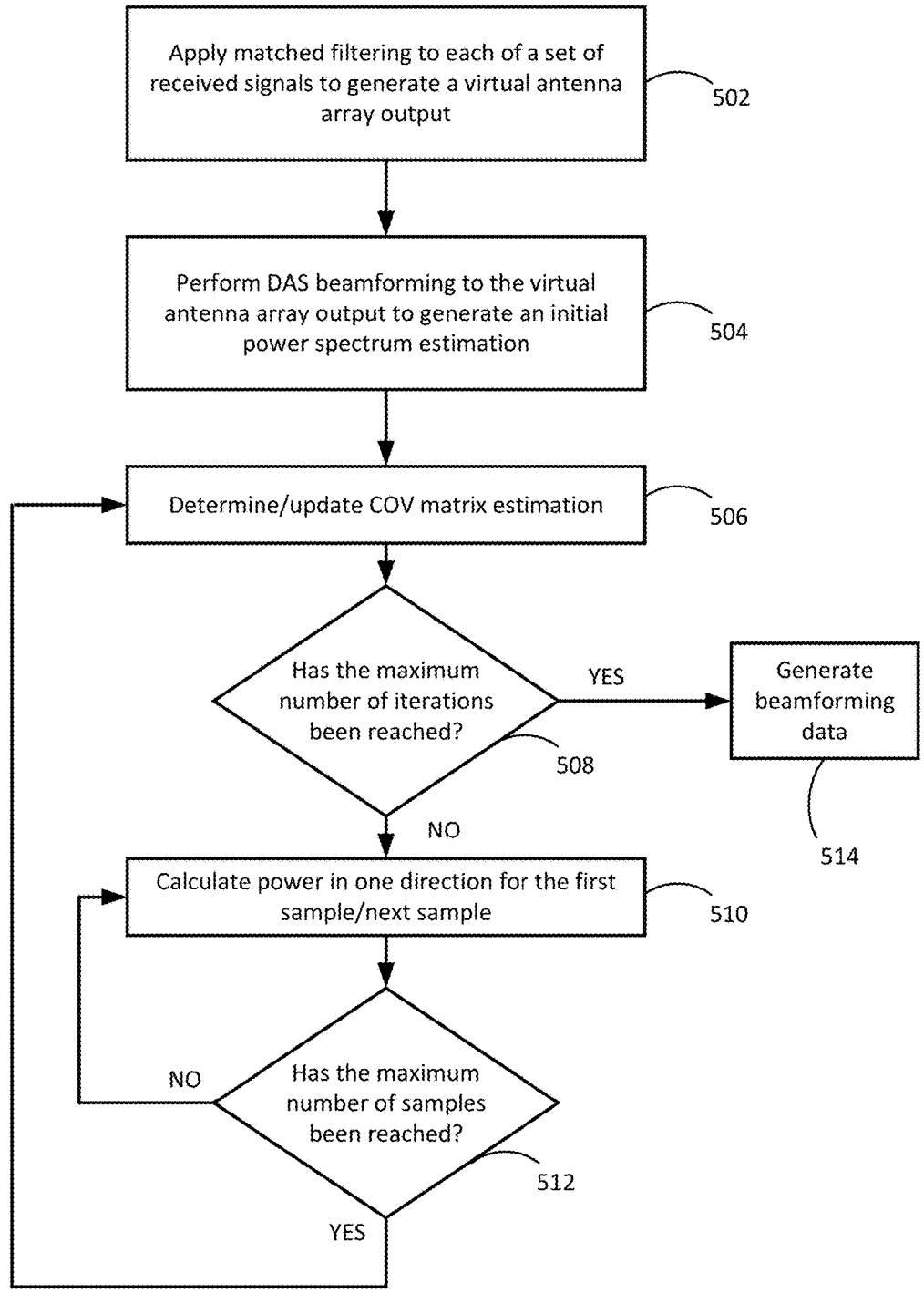
FIG. 5 illustrates a method flow associated with a reduced-complexity iterative adaptive approach (RC-IAA) algorithm, in accordance with an aspect of the disclosure.

FIG. 5 illustrates a method flow associated with a reduced-complexity iterative adaptive approach (RC-IAA) algorithm, in accordance with an aspect of the disclosure. With reference to FIG. 5, the method flow 500 may be a computer-implemented method executed by and/or otherwise associated with one or more processors and/or storage devices. These processors and/or storage devices may be, for instance, associated with the device 100 as shown and described with reference to FIGS. 1A-1B, for example. In an aspect, the method flow 500 may be performed via one or more processors (e.g., processing circuitry 102 as shown in FIG. 1A) executing instructions stored on a suitable storage medium (e.g., a non-transitory computer-readable storage medium such as memory 104, as shown in FIG. 1A).

The method flow 500 may begin by applying (block 502) matched filtering to each of a set of received signals to generate a virtual antenna array output. This may include, for instance, the use of the matched filters as shown and described with reference to FIG. 1B, which produce a virtual array output to the DAS beamforming circuitry blocks 155.1-155.Nrx.

The method flow 500 may continue by performing (block 504) DAS beamforming to the virtual antenna array output to generate an initial power spectrum estimation with respect to the received signals. This may include, for instance, the use of the DAS beamforming algorithm as shown and described with reference to the DAS beamforming circuitry blocks 155.1-155.Nrx as shown in FIG. 1B. An example of this DAS beamforming algorithm is also shown and described with reference to Table 2A.

The method flow 500 may continue by determining (block 506) an initial COV matrix estimation using the initial power spectrum estimation with respect to the received signals. This may include, for instance, the use of the IAA beamforming algorithm as shown and described with reference to the IAA algorithm circuitry block 109 as shown in FIG. 1B. Continuing this example, the IAA circuitry block 109 may also be implemented to perform the remaining steps of the method flow 500 as shown in FIG. 5. As an example, the initial COV matrix estimation may be performed in accordance with the outer loop of the IAA algorithm as shown in Table 2B.

The method flow 500 may continue assuming that the maximum number of iterations has not been reached (block 508—NO). In other words, the IAA algorithm may proceed as shown in Table 2A and continue to perform processing operations as discussed herein for a suitable number of iterations (e.g. 5).

Assuming that the maximum number of iterations is not reached, the method flow 500 may continue to calculate (block 510) power in one direction by evaluating a number of power spectrum samples (e.g., 200). As an example, power calculation may be performed in accordance with the inner loop of the IAA algorithm as shown in Table 2B. Continuing this example, the method flow 500 may continue to iteratively calculate, within the outer loop, the power in one direction until the last sample is reached (block 512—YES). When this occurs, the method flow 500 may proceed to update the COV matrix estimation using the calculated power in one direction, and then repeat this process for additional directions until the maximum number of iterations (e.g., 5) has been reached (block 508—YES). Once this occurs, the IAA algorithm may generate (block 514) beamforming data using the most recent calculations of the COV matrix and the power calculations in each direction.

Section 2—Beam Space Iterative Adaptive Approach (BS-IAA) Algorithm for Beamforming The BS-IAA algorithm discussed in this Section, similar to the RC-IAA algorithm, also provides a lower complexity solution with respect to existing adaptive beamforming techniques, as the algorithm does not apply the IAA algorithm to the entire virtual array. However, the BS-IAA implements an additional step as further described below. The first step of the BS-IAA algorithm is similar or identical to the first step of the RC-IAA algorithm discussed in Section 1. In particular, the BS-IAA algorithm described in this Section may also estimate the initial spectrum using DAS beamforming. However, instead of applying the IAA algorithm to the output of the DAS beamforming step, an intermediate step is introduced that detects regions of interest (ROIs) as one or more angular regions where it is suspected that one or more targets are located. As the third step, a local adaptive beamforming algorithm is executed on each of the detected ROIs, significantly improving the resolution on the ROIs. The local adaptive beamforming algorithm is based on combining the IAA algorithm and beam space processing, as further discussed below.

Thus, the BS-IAA algorithm aspects also provide advantages with respect to the classic and adaptive beamforming techniques described above. In particular, the BS-IAA beamforming algorithm provides a high resolution output that is equal (or nearly equal) to the advanced adaptive beamforming methods (such as full virtual array IAA adaptive beamforming. Moreover, the BS-IAA algorithm aspects described in this Section may also be implemented with a reduced complexity compared to existing adaptive beamforming solutions. As further discussed below, this is due to the additive beamforming being applied only to regions that are suspected to contain targets, whereas existing super-resolution approaches require that the adaptive beamforming calculations be applied at each point of the angle axis grid. Furthermore, the use of beam space processing enables a reduction in the size of COV matrix, which significantly reduces the complexity of its inversion.

Figure 6A:
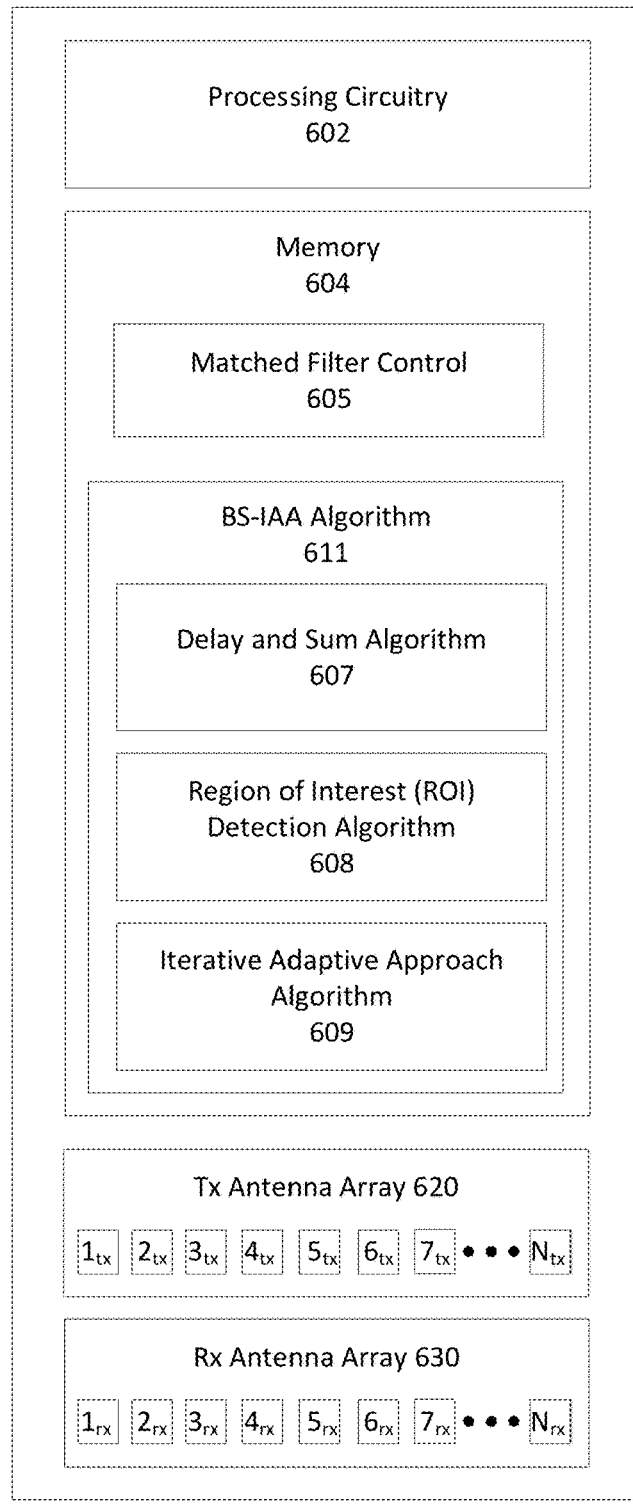
FIG. 6A illustrates a block diagram of an exemplary MIMO radar device, in accordance with an aspect of the disclosure.

FIG. 6A illustrates a block diagram of an exemplary MIMO radar device, in accordance with an aspect of the disclosure. The MIMO radar device 600 as shown in FIG. 6A may be implemented with identical or substantially similar parts as the MIMO radar device 100 as shown and described in Section 1 with respect to FIG. 1A, and therefore only differences between the MIMO radar device 100 and the MIMO radar device 600 are further described in this Section. Although the MIMO radar device 100 and the MIMO radar device 600 are described in Sections 1 and 2 as being separate devices, the aspects as described herein may be implemented on a single device or on separate devices. For example, a single MIMO radar device may combine the functions of both the MIMO radar device 100 and the MIMO radar device 600 into a single MIMO radar device that is configured to execute either the RS-IAA algorithm, the BS-IAA algorithm, or both the RS-IAA and the BS-IAA algorithms separately or in combination with one another.

In an aspect, the MIMO radar device 600 may include processing circuitry 602, a memory 604, a transmit antenna array 620 including any suitable number Ntx of transmit antennas and a receive antenna array 630 including any suitable number Nrx or receive antennas. These components may be identical to or operate in a substantially similar manner as the processing circuitry 102, the memory 104, the transmit antenna array 120, and the receive antenna array 130, respectively, as described in Section 1 with reference to the MIMO radar device 100 as shown in FIG. 1A.

Moreover, like the MIMO radar device 100, the MIMO radar device 600 may also include matched filter control circuitry 605, which may function in a manner that is identical to or substantially similar as the matched filter control circuitry 105 of the MIMO radar device 100 as described in Section 1, and may detect known signals as part of one or more radar signal processing operations. The MIMO radar device 600 also stores executable code, logic, instructions, etc., to facilitate the execution of the BS-IAA algorithm, as further discussed in this Section. Thus, the MIMO radar device 600 includes several modules stored in the memory 604 that constitute a different executed function associated with the overall operation of the BS-IAA algorithm, as further described below.

In an aspect, the beam space iterative adaptive approach (BS-IAA) algorithm is implemented as a combination of the three steps described herein. A summary of the BS-IAA algorithm including each of these steps is shown in Tables 4A-4C and further discussed below. Thus, aspects include the BS-IAA algorithm being performed via execution of instructions stored in the BS-IAA algorithm module 611 by the processing circuitry 602 as shown in FIG. 6A, which includes execution of the delay and sum algorithm module 607 (step 1), the execution of the ROI detection algorithm module 608 (step 2), and the execution of the IAA algorithm module 609 (step 3).

Figure 6B:
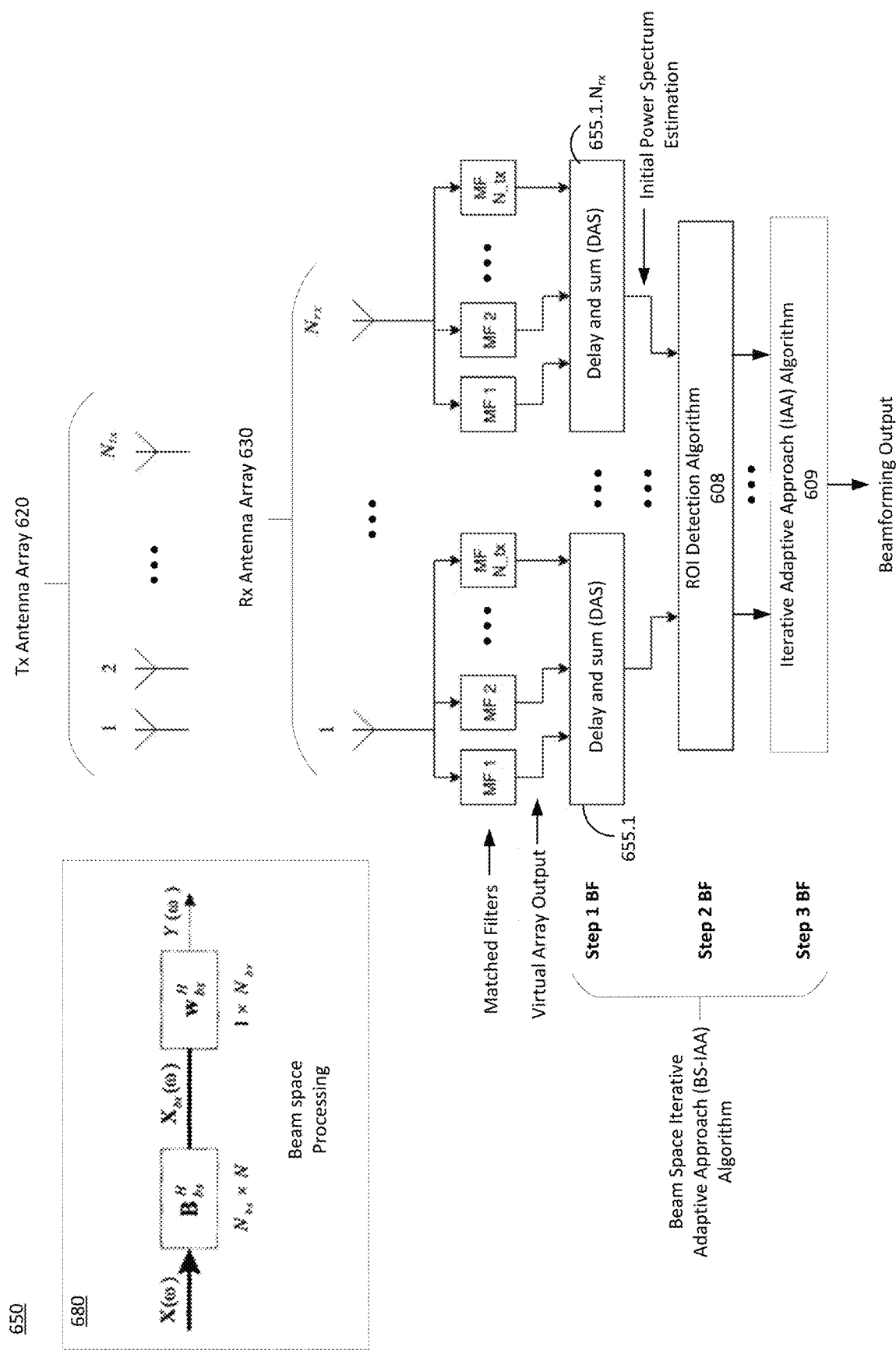
FIG. 6B illustrates a block diagram showing additional detail and processing flow associated with the MIMO radar device of FIG. 6A, in accordance with an aspect of the disclosure.

Referring now to FIG. 6B, which illustrates a block diagram 650 of an example adaptive beamforming technique in accordance with an aspect of the disclosure, aspects include the MIMO radar device 600 implementing a number of matched filters (denoted MF 1, MF 2, etc.) configured in an identical or substantially similar manner as those discussed above in Section 1 with reference to the MIMO radar device 100, the block diagram 150, and FIGS. 1A-1B. Thus, each matched filter is coupled to each receive antenna within the receive antenna array 630, and the matched filters may be tuned, controlled, monitored, and/or each respective received signal processed via the matched filter control circuitry 605, which again may be implemented as a software-based solution, a hardware-based solution, or a combination of both software and hardware-based solutions, in various aspects.

Thus, as shown in FIG. 6B, the virtual array is represented as an aggregation of each signal output from each matched filter. The first step in the BS-IAA algorithm is identical to or substantially similar as that shown and discussed in Section 1 above with reference to the MIMO radar device 100, the block diagram 150, and FIGS. 1A-1B. Thus, the first step of the BS-IAA algorithm also includes the use of a number of delay and sum (DAS) circuitry blocks equal to the number Nrx of receive antennas to perform DAS beamforming and to determine an initial power spectrum estimation.

The DAS circuitry blocks 655.1-655.Nrx may also be implemented identical to or substantially similar as the DAS circuitry blocks 155.1-155.Nrx, as shown in FIG. 1B. In an aspect, the DAS circuitry blocks 655.1-655.Nrx may be tuned, controlled, monitored, and/or each respective received signal processed via the delay and sum algorithm 607 as shown in FIG. 6A, which may work in conjunction with processing circuitry 602 to do so. Again, in various aspects, the delay and sum algorithm 607 may be implemented as a software-based solution, a hardware-based solution, or a combination of both software and hardware-based solutions.

In any event, this first step of the BS-IAA algorithm, which includes the initial spectral estimation, is reproduced again below in Table 4A for clarity and includes some additional notations that are relevant to the BS-IAA algorithm. As shown in Table 4A below, to reduce the sidelobes of the beam pattern, aspects include using a windowing function (e.g. a Hamming or Chebyshev window) as part of the DAS beamforming step. This windowing function may also be used as part of the step 1 DAS beamforming algorithm in Section 1 with respect to FIG. 1B. By reducing the sidelobes, it is ensured that far targets do not obscure (i.e. do not affect) one other.

fixed (i.e. non-adaptive) DAS beamforming. Thus, $B_{bs}$ denotes a matrix representing fixed beamforming directions, and $w_{bs}$ denotes a vector of adaptive beamforming (e.g. Capon or minimum variance distortionless response (MVDR)).

With the following notations understood as defined above, the beam space transformation used in accordance with the beam space processing as shown in inset 680 of FIG. 6B has the following properties. First, usually $N_{bs} < N$, and thus the complexity of the adaptive beamforming in the beam space is reduced. Second, usually the fixed beamforming matrix is orthogonal such that $B_{bs}^H B_{bs} = I$, which is the case when using discrete Fourier transform (DFT) beamforming, for instance.

TABLE 4A

| Algorithm | Comments | Complexity (in MAC) |
| --- | --- | --- |
| Notations and inits<br>Spectrum grid $\{\theta_i\}_0^{Ngrid-1}$<br>TX steering vector $a_t(\theta_i)$<br>RX steering vector $a_r(\theta_i)$<br>The window for spectral estimation: w<br>Power in direction $\theta_i$: $P_i$<br>Peak detector<br>Scaling for noise level for threshold calc.<br>Size of the region of interest around each peak: $N_{ROI}$<br>Beam-space<br>A number of beams: $N_{beams} = N_{virt}$<br>(as the size of DFT BF)<br>Size of beam sector matrix: $K_{bs}$ [beams]<br>Set of beam sectors matrices:<br>$\{B_{bs}\}_0^{Nsector-1}$, where $N_{sector}$ is a number of beam-sectors<br>Step (in beams) between adjacent beam sectors: $K_{bs\ step}$ | | $N_{tx} = 6$<br>$N_{rx} = 16$<br>$N_{virt} = 96$<br>$N_{grid} = 200$ – number of sample of the spectrum<br>$iter_{num} = 5$<br>$K_{bs} = 7$<br>$K_{bs\ step} = 5$<br>$N_{sector} = 20$<br>Complex * complex = 4 mult<br>Real * complex = 2 mult |
| for k = 1: $N_{sector}$<br>$R_{yy\_bs}(k) = Re\ \{B_{bs}(k)yy^H B_{bs}^H(k)\}$<br>end | Compute $R_{yy\_bs}$ for each beam sector, Re{ } is due to forward-backward averaging | $2 * N_{sector} *$<br>$(K_{bs} * N_{virt} + K_{bs} * K_{bs}) = 29K$ |
| DAS spectrum estimation<br>for i = 1: $N_{grid}$<br>$a_{t_i} = a_t(\theta_i)$<br>$a_{r_i} = a_r(\theta_i)$<br>$a_{v_i} = vec\ (a_{r_i}\ a_{t_i}^T)$<br>$p_i = a_{v_i}^H\ diag(w)\ R_{yy}\ diag(w)\ a_{v_i}$<br>A(:, i) = $a_{v_i}$<br>end | | $4 * N_{virt} * N_{virt}/2 = 20K$<br><br>Loop total = $N_{grid} *$<br>$20K = 4M$ |

As shown in Table 4A above, the first step in the BS-IAA algorithm functions to perform DAS beamforming to provide an initial spectrum estimation, which is similar to the DAS beamforming algorithm as shown in Table 2A. However, the DAS beamforming algorithm shown in Table 4A, which is used as part of the BS-IAA algorithm, implements beam space processing to do so. To provide additional clarity, an explanation of beam space processing is presented in further detail below with respect to the inset 680 in FIG. 6B.

As shown in inset 680 of FIG. 6B, an element-space signal is denoted as X, which represents signals taken at the output of each physical antenna or, in the example shown in Table 4A as part of the first step of the BS-IAA aspects described in this Section, at the output of the virtual antenna array channels. Furthermore, the beam space signal is denoted as $X_{bs}$ and represents the signals after applying the With respect to the use of Capon beamforming, in the element $$space = \frac{R^{-1}a}{a^H R^{-1} a}.$$

Moreover, COV matrix R has a size equal to N×N. In the beam space, $$w_{bs} = \frac{R_{bs}^{-1} a_{bs}}{a_{bs}^H R_{bs}^{-1} a_{bs}},$$

where $R_{bs} = B_{bs}\ R\ B_{bs}^H$ is the COV matrix in the BS of size $N_{bs} \times N_{bs}$ and $a_{bs} = B_{bs}\ a$.

Figure 6C:
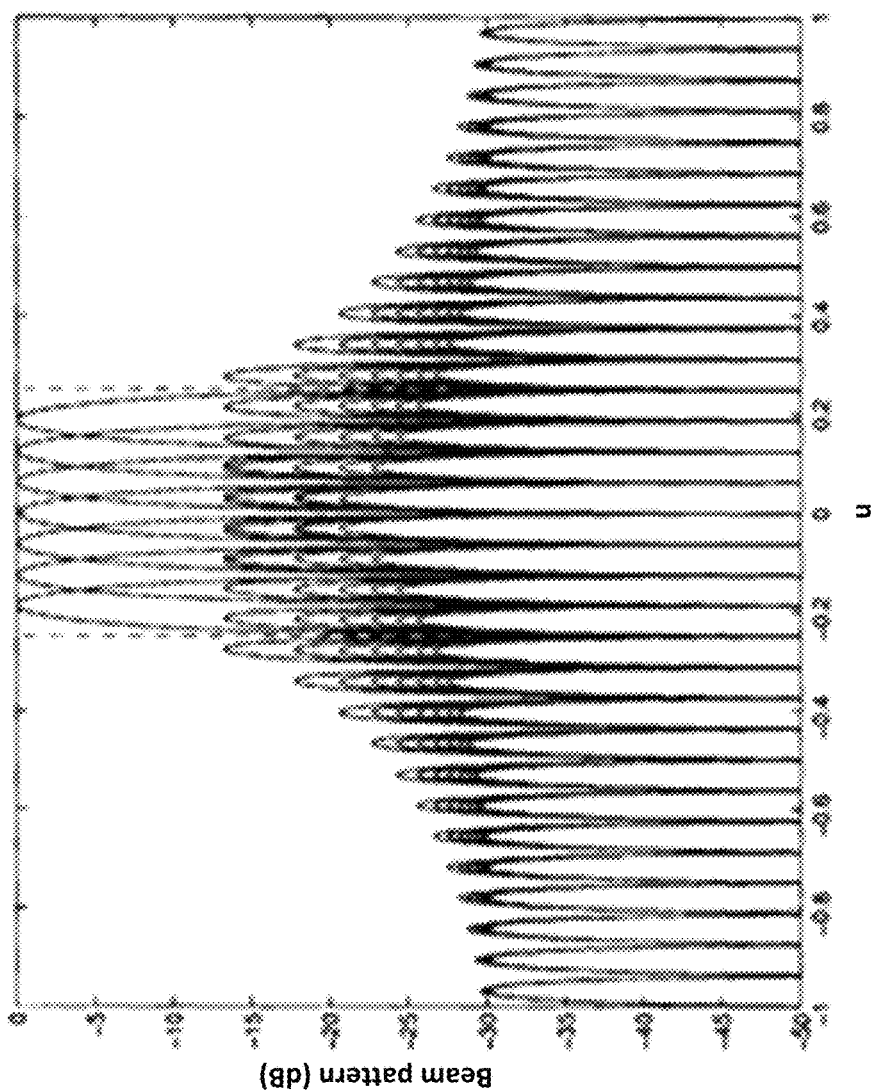
FIG. 6C illustrates an example transformation of an element space (32 elements) to beam space (7 beams), in accordance with an aspect of the disclosure.

The array symmetry of the uniform linear array (ULA) is generally used to improve the COV matrix estimation using a technique known as forward-backward (FB) averaging. The application of this technique on the COV matrix in the beam space is given by Rbsfb={Rbs}. An additional advantage of the FB averaging is that the COV matrix becomes real, and therefore this reduces the number of complex multiplications required in further calculations. As an example of beam space transformation, FIG. 6C illustrates an example of element space (32 elements) being transformed to the beam space (7 beams), in accordance with an aspect of the disclosure. The beam sector lies between the vertical lines as shown in FIG. 6C.

Thus, the first step of the BS-IAA algorithm implements beam space processing to provide the initial spectral estimation using the virtual array. The following assumptions are also provided with respect to the DAS beamforming algorithm shown in Table 4A:

1. The number index in ROI is 20% of the grid, $N_{ROI}=40$;

2. The number of active sectors $N_{act\ sect}=5$;

3. All indices in the active sector are in the ROI A number of ROI indices (samples of the grid) per sector: $N_{samp\_sect}=200/20=10$.

Again, the DAS beamforming step in Table 4A may implement windowing to reduce the sidelobes of the beam pattern. However, windowing functions may cause a widening of the main lobe of the beam, which yields reduced spatial resolution. Therefore, to improve the resolution, aspects include detecting regions of interest in the second step, which indicates regions where targets are suspected to be found, and then applying local adaptive beamforming in the third step to further improve the resolution in these detected regions.

As discussed in further detail below, the second step of the BS-IAA algorithm thus uses the initial power spectrum estimation provided by the DAS beamforming (step 1) to identify one or more regions of interest (ROIs) in beam space. An example algorithm associated with this second step of the BS-IAA algorithm is shown below in Table 4B.

TABLE 4B

| Algorithm | Comments | Complexity (in MAC) |
|---|---|---|
| Notations and inits | | |
| Peak detector | | |
| Scaling for noise level for threshold calc. | | |
| Size of the region of interest around each peak: $N_{ROI}$ | | |
| Peak detection (OS-CFAR) (peak inx, $\sigma_{noise}^2$) = OS CFAR(p) | detect peaks, and estimate the noise level | Sort ago $N_{grid} * \log 2(N_{grid}) = 1.5K$ |
| roi_inx = conv(peak inx, rect($N_{samp\_sect}$)) roi_mask = logical (roi_inx) | add ROI around each peak logical indicators on the grid for ROI | |

TABLE 4B-continued

| Algorithm | Comments | Complexity (in MAC) |
|---|---|---|
| ROI indices to beam sectors association Find for each ROI index, to which beam sector it relates Indices of active beam sector: act_sector_inx East sector has set of indexes where power should be estimated {roi_sector_inx} | | |

In various aspects, the ROI detection may be performed using any number of suitable techniques, such as one of the classic detection methods including ordered-statistic constant false-alarm rate (OS-CFAR) or cell averaging constant false-alarm rate (CA-CFAR). As OS-CFAR and CA-CFAR are known techniques, additional details regarding this portion of the ROI detection algorithm as shown in Table 4B are not further described herein. In the example ROI detection algorithm shown in Table 4B, the ROI detection algorithm implements OS-CFAR to detect peaks in the spectrum. The ROI detection algorithm is further discussed below with reference to FIGS. 7A-7C.

Figure 7A:
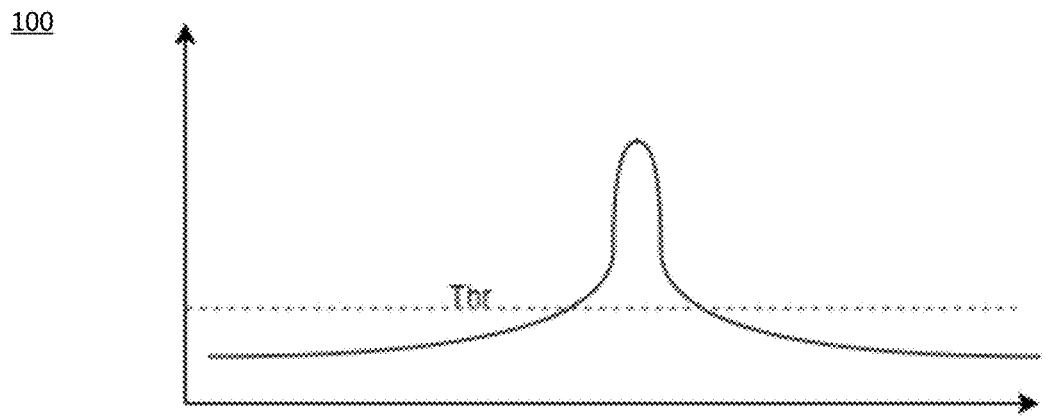
FIGS. 7A-7C illustrate the steps associated with the BS-IAA, in accordance with an aspect of the disclosure.

In an aspect, the ROI detection algorithm implements a detection threshold, which is denoted in FIG. 7A as "Thr" to detect ROIs from the estimated spectrum. This threshold value may be any suitable value including a predetermined value or a dynamically adjusted value that is selected based upon the particular application, the current noise environment, the anticipated noise environment, channel conditions, etc. However, to ensure that targets are not missed, aspects include implementing a relatively low detection threshold Thr that represents a tradeoff between avoiding false detections due to noise and ensuring that targets are not missed. For instance, the Thr value may represent a value of several decibels (e.g. 3, 5, 6, 10, etc.) from the noise floor. In the event that a target is "missed," the final spectral estimation in the region near the target will be the same as DAS beamforming spectrum (i.e. DAS beamforming is a lower bound of the spectrum estimation accuracy).

Figure 7B:
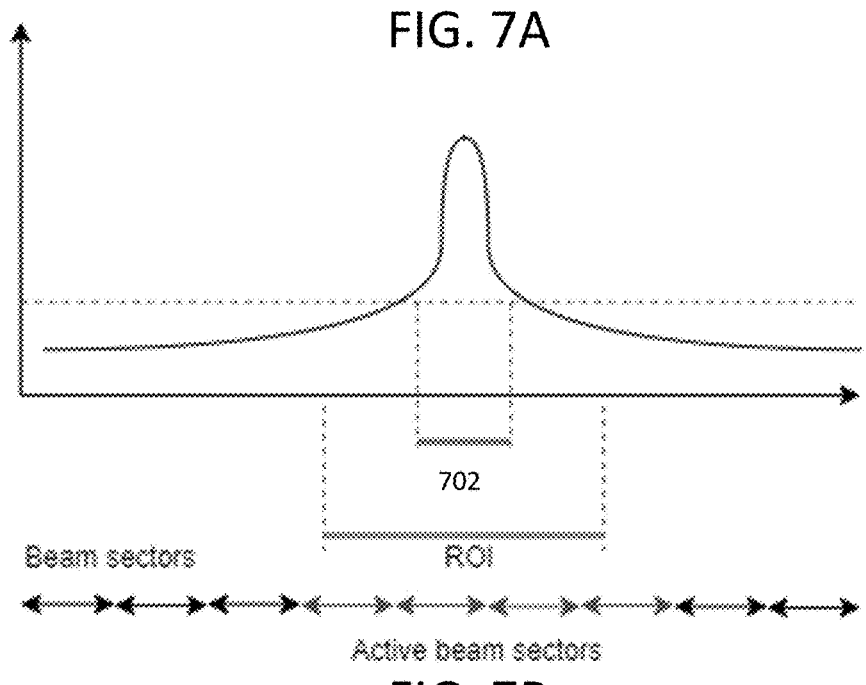

In an aspect, portions of the spectrum having a power that exceeds the threshold value Thr define a region 702 as shown in FIG. 7B. Aspects further include using the ROI detection algorithm to calculate, around each peak (i.e. region 702), a ROI. In various aspects, the width of the ROI is dictated by the beam pattern of the DAS (i.e., by the width of the main lobe of the beam pattern). Thus, the ROI detection algorithm functions to identify regions of beam space that likely contain targets of interest based upon a desired selected threshold. The detected ROI thus defines active beam sectors that are a subset of the overall set of beam sectors as shown in FIG. 7B.

As further discussed below with reference to Table 4C, aspects include the BS-IAA algorithm advantageously executing, as the third step, the IAA algorithm only on the active beam sectors as indicated in each of the detected ROIs using beam space processing, as discussed above and further described in Table 4C below, to reduce time and complexity required to identify the desired beamforming pattern and DoA. An example algorithm associated with this third step of the BS-IAA algorithm is shown below in Table 4C.

TABLE 4C

| Algorithm | Complexity (in MAC) |
|---|---|
| Notations and inits | |
| Beam space | |
|     A number of beams: $N_{beams} = N_{virt}$ (as the size of DFT BF) | |
|     Size of beam sector matrix: $K_{bs}$ [beams] | |
|     Set of beam sectors matrices: $\{B_{bs}\}_0^{N_{sector}-1}$, | |
| where | |
|     $N_{sector}$ is a number of beam-sectors | |
|     Step (in beams) between adjacent beam sectors: | |
|     $K_{bs\_step}$ | |
| IAA iterations | |
| for i = 1: iter_num | aaH is computed beforehand, p is real |
|   $R_{iaa} = A_{mask}\,\mathrm{diag}(p.*roi_{mask})A_{mask}^{H} + I\sigma_{noise}^{2}$ | $2\dfrac{N_{virt}^{2}}{2} * N_{ROI} = 400K$ |
|   for k from act_sector_inx | |
|     $B_{bs}$ = set of sector matrices (k) | $N_{act\_sect} * 2 * N_{virt}^{2} * K_{bs} = 700K$ |
|     $R_{iaa\_bs} = \mathrm{Re}\{B_{bs}\,R_{iaa}\,B_{bs}^{H}\}$ | $N_{act\_sect} * K_{bs}^{3}/2 = 1K$ |
|     $R_{iaa\_bs}^{-1} = \mathrm{inv}(R_{iaa\_bs})$ | $K_{bs}^{3}/2 = 0.2K$ |
|     for j from roi_sector_inx | $N_{act\_sect} * N_{samp_{sect}} *$ |
|       $a_{bs_j} = B_{bs}\,a_{v_j}$ | 2(numerator and denum.) * |
|       $p_j = \dfrac{a_{bs_j}^{H} R_{iaa\_bs}^{-1} R_{yy\_bs} R_{iaa\_bs}^{-1} a_{bs_j}}{\left(a_{bs_j}^{H} R_{iaa\_bs}^{-1} a_{bs_j}\right)^{2}}$ | $2(\mathrm{real}) * \dfrac{K_{bs}^{2}}{2} = 5K$ |
|     end | |
|   end | |
| end | |
| | Loop total = 1.1M * 5 = 5.5M |
| | Total: 9.5M |

As shown in Table 4C above, within the IAA (outer) loop, the COV matrix $R_{iaa}$ is estimated iteratively (similarly to line 4 in Table 1 with respect to R). In other words, the IAA COV matrix estimation is based on samples in the ROI, with diagonal loading.

Next, for each active beam sector (i.e., the beam sectors associated with each detected ROI), a beam transform is defined as $B_{bs}$, which is a set of sector matrices of size $N_{bs} \times N$, where $N_{bs}$ is the size of the beam sector. The rows of DFT matrix (N×N) are then used to produce the $B_{bs}$ matrix using beam space processing techniques as discussed above. Thus, the BS COV matrix for processing each active beam sector is given by $R_{iaa\_bs} = \mathrm{Re}\{B_{bs}\,R_{iaa}\,B_{bs}^{H}\}$. Again, the operator $\mathrm{Re}\{\ \}$ is used as a result of the forward-backward averaging. The size of this matrix $R_{iaa\_bs}$ is $N_{bs} \times N_{bs}$ instead of N×N in the original COV matrix $R_{iaa}$. Consequently, the inversion of the matrix $R_{iaa\_bs}$ to $R_{iaa\_bs}^{-1}$ advantageously requires $O(N_{bs}^{3})$ operations, instead of $O(N^{3})$ operations. In addition, $R_{iaa\_bs}$ is a real matrix, which further reduces the complexity of additional calculations. The inverse COV matrix $R_{iaa\_bs}^{-1}$ may then be multiplied by the matrix $R_{yy\_bs}$ for each active beam sector as noted above in Table 4A by the following expression: $R_{iaa\_bs}^{-1}\,R_{yy\_bs}\,R_{iaa\_bs}^{-1}$.

Therefore, as shown in Table 4C above, the $R_{iaa\_bs}$ matrix is used to estimate powers in specific beam sectors (similar to the inner loop in Table 1 that operates on the matrix $\overline{R}$ using IAA). However, in accordance with an aspect, the third step of the BS-IAA algorithm described in this Section also converts the steering vectors to the beam space by operation of $a_{bs_j} = B_{bs}\,a_{v_j}$, as indicated in the most inner loop of Table 4C. This loop of the IAA algorithm describes another loop with respect to the index j, which causes the algorithm to loop (i.e. repeat) for each detected ROI in accordance with the ROI sector index as shown in Table 4C (i.e., looping on roi_sector_inx). The resulting calculation yields the steering vector $p_j$ in beam space, with the power being updated with each passage through the 'j' loop. Thus, once the estimation of the power in all beam sectors is completed, the COV matrix is estimated again as in the original IAA approach (see Table 1).

Figure 7C:
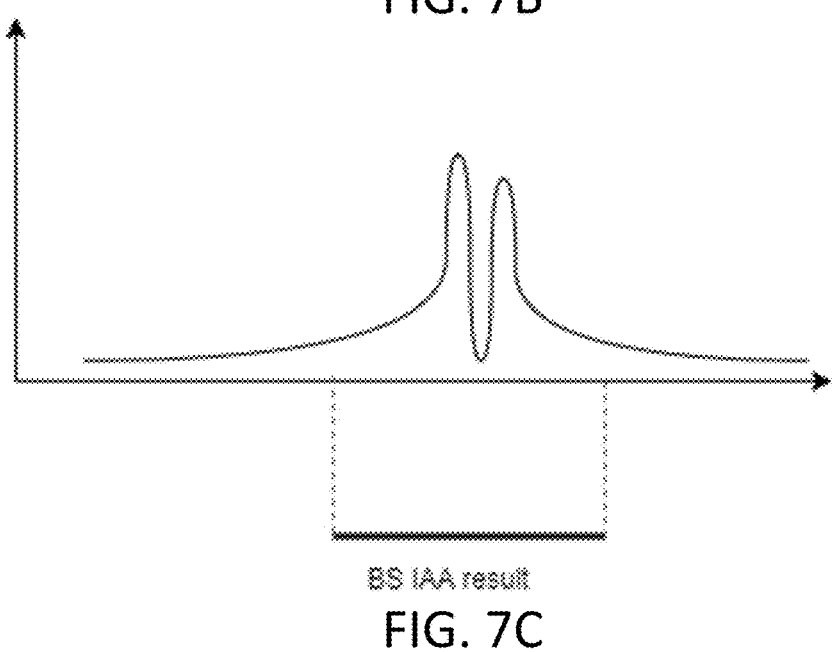

FIG. 7C shows the overall result of the BS-IAA algorithm once the third step has been completed on the active beams associated with a particular detected ROI. As noted above in Section 1, this beamforming data may subsequently be used to identify the DoA associated with individually detected targets based upon the high resolution the BS-IAA algorithm provides. Furthermore, the high resolution adaptive beamforming solution obtained by the BS-IAA algorithm still provides a significant reduction in complexity compared to existing non-adaptive (DAS) and full virtual array adaptive The COV matrix estimation technique described above with respect to Table 4C is but one example of COV matrix estimation that may be implemented in accordance with the BS-IAA algorithm aspects discussed in this Section. Aspects include the use of any suitable type of COV matrix estimation technique once the ROIs are detected in step 2 of the BS-IAA algorithm as noted above. For instance, in an aspect, the estimation of the COV matrix $R_{iaa}$ as shown in Table 4C above may alternatively be computed as shown below in Equation 1.

$$R_{iaa} = A_p\,\mathrm{diag}(p.*roi_{mask})A_p^{H} + A_{notp}\,\mathrm{diag}(p.*not(roi_{mask}))A_{notp}^{H} \qquad \text{Eqn. 1}$$

This alternative approach for COV matrix estimation is more accurate, but has higher complexity. Moreover, the 2nd matrix of the sum in Eqn. 1 ($A_{notp}$) should be computed only once since it doesn't change with the iterations. Therefore, the desired application, cost, and implemented hardware may drive the decision regarding a particular implementation of COV estimation.

Thus, using the example values as shown in Tables 4A-4C above, an overall complexity value in terms of MAC is calculated for the BS-IAA algorithm of approximately 9.5 M. The complexity and performance of the BS-IAA algorithm is shown in further detail below in Table 5 compared to other conventional techniques to calculate beamforming data.

TABLE 5

| Algorithm | Complexity [MAC] | Comments |
|---|---|---|
| DAS virtual array | 4M | Complexity analysis is shown in Table 2A. |
| IAA virtual array | 55M | The most computationally demanding operations are estimation and inversion of the COV matrix. |
| BS-IAA | 9.5M | Complexity analysis is shown in Tables 4A-4C. |

The first algorithm and second algorithms in Table 5 above (the DAS virtual array and the IAA virtual array) are the same as those discussed in Section 1 above and are reproduced from Table 3. The third algorithm is the BS-IAA to which the aspects of the present disclosure as discussed in Section 2 are directed, which is summarized in Tables 4A-4C above along with a corresponding complexity analysis. As can be seen from the results of the complexity analysis, the BS-IAA introduces some additional complexity compared to non-adaptive solutions to achieve an adaptable beamforming solution (9.5M vs 4M), but is significantly less complex compared to the IAA virtual array solution (9.5M vs 55M).

Figure 8A:
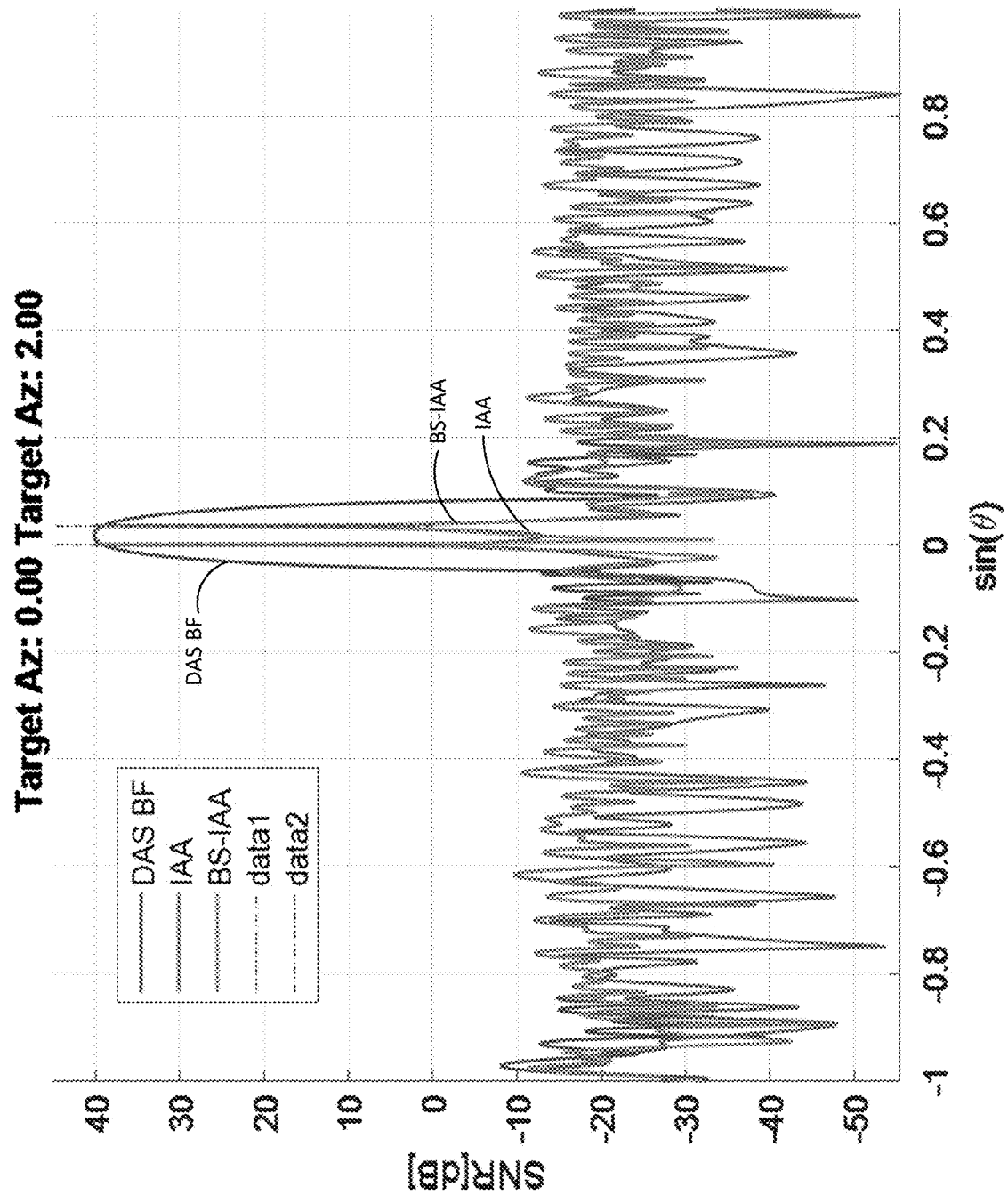
FIGS. 8A-8B illustrate a SNR vs. azimuth angle graph for two targets corresponding to different beamforming algorithms, in accordance with an aspect of the disclosure.
Figure 8B:
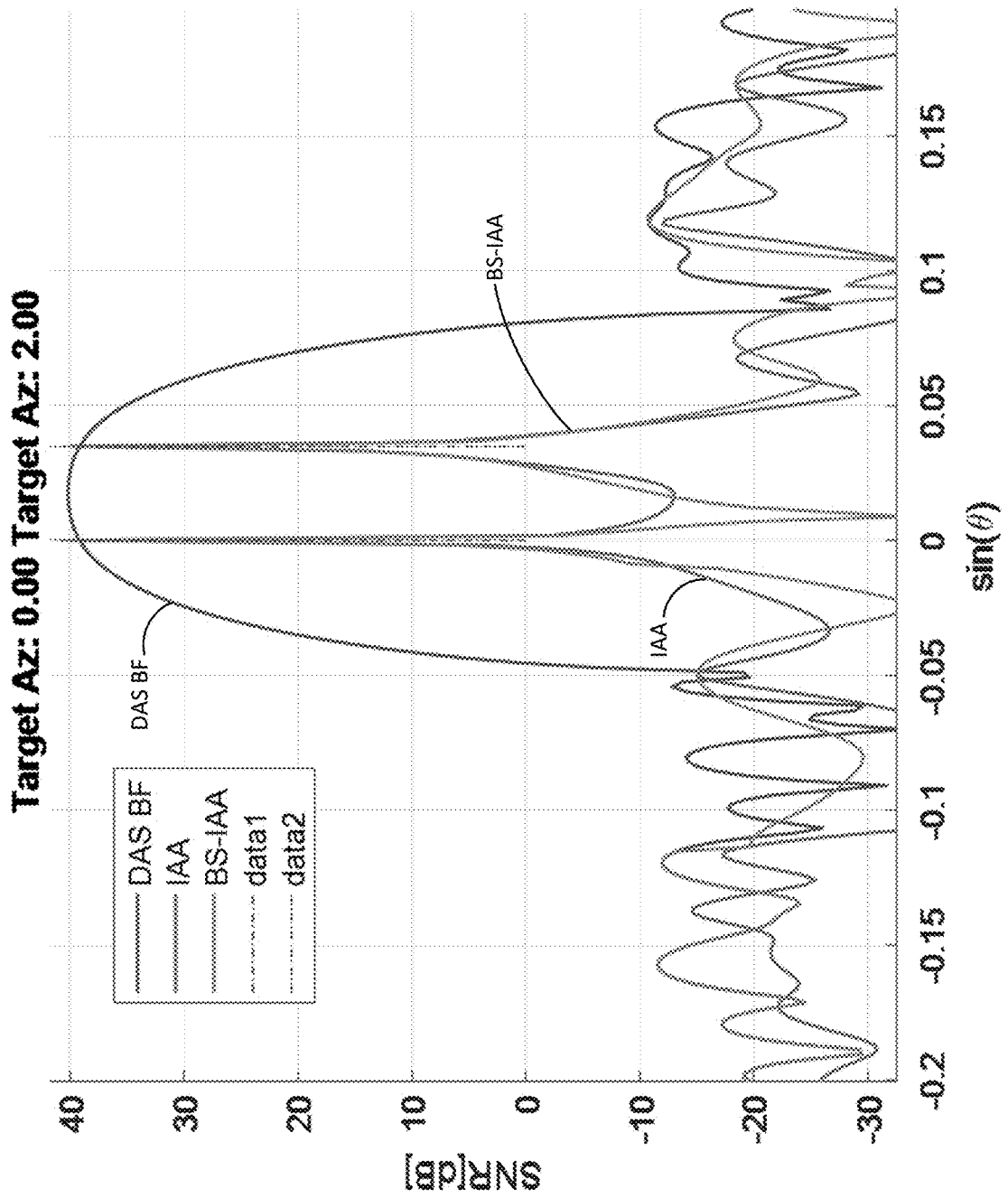
Figure 9:
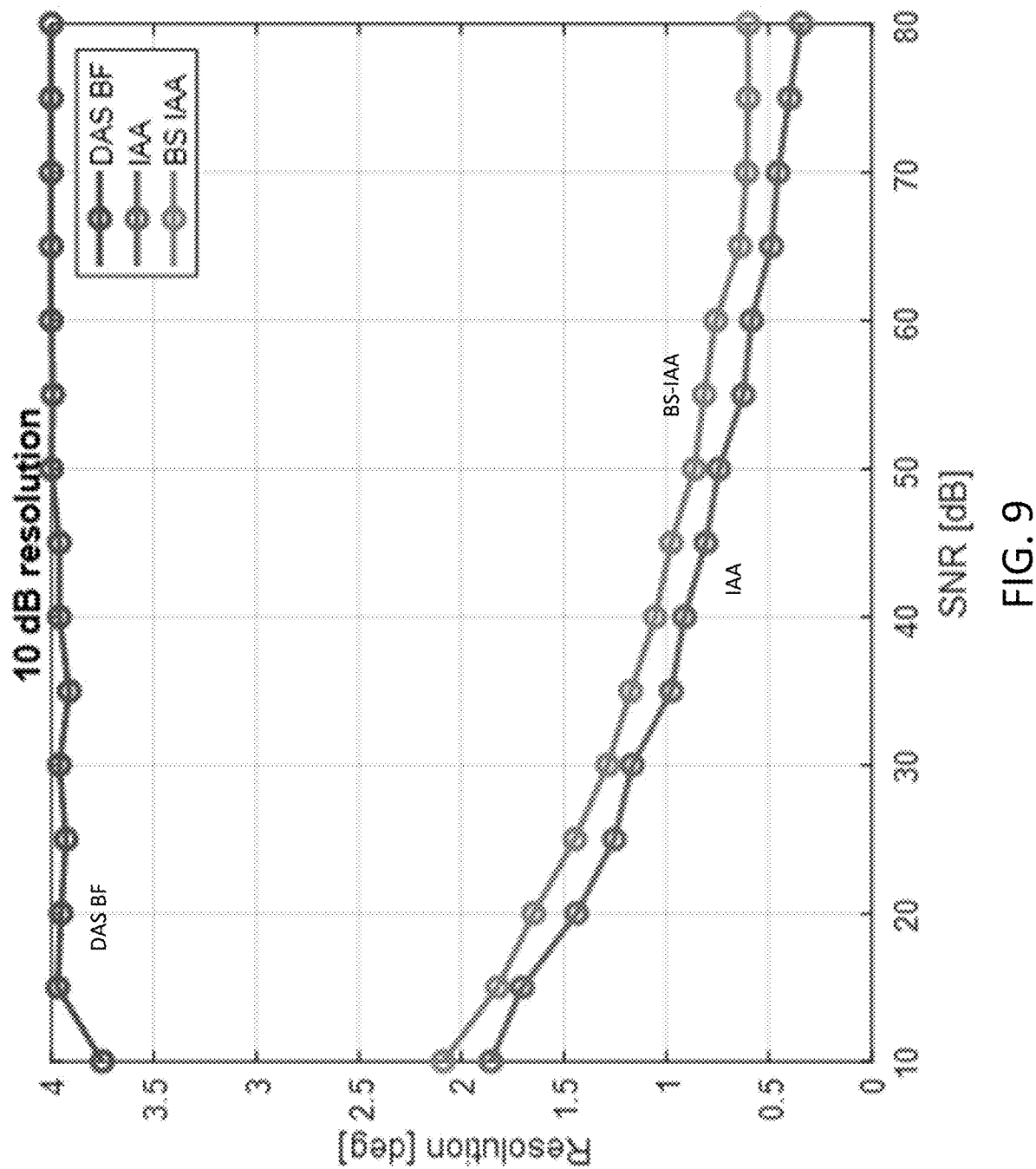
FIG. 9 illustrates a resolution vs. SNR graph corresponding to different beamforming algorithms, in accordance with an aspect of the disclosure.
Figure 10:
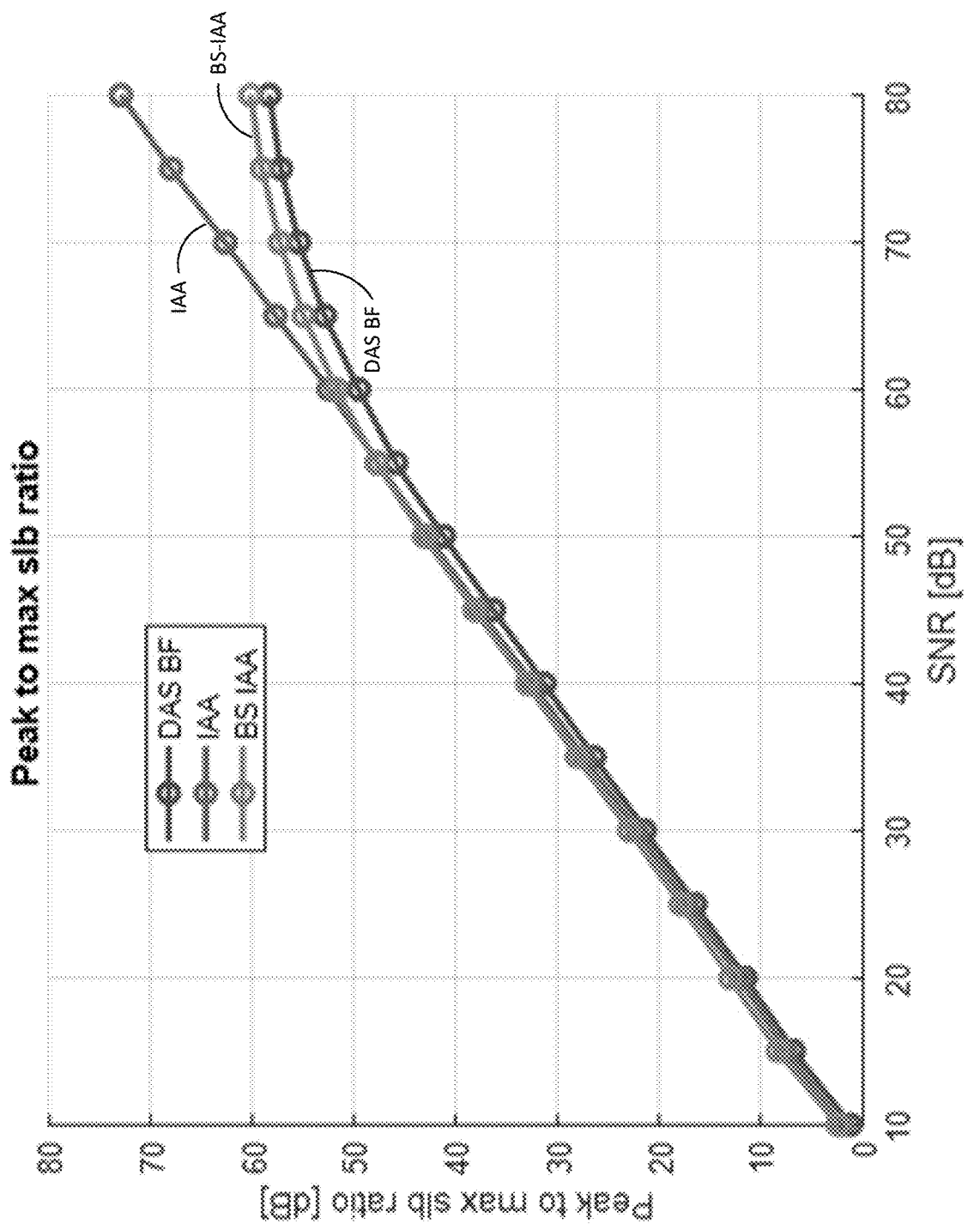
FIG. 10 illustrates a peak to maximum side lobe power ratio vs. SNR graph corresponding to different beamforming algorithms, in accordance with an aspect of the disclosure.

FIGS. 8A, 8A, 9, and 10 provide graphs that compare various metrics of performance of the different algorithms shown in Table 5. For example, FIGS. 8A-8B illustrates a SNR vs. azimuth angle graph for two targets corresponding to different beamforming algorithms, in accordance with an aspect of the disclosure. FIGS. 8A-8B depict the same values but in different X-axis scales. FIG. 8A illustrates the SNR over a range of azimuth angles of −1.0 to +0.8 degrees, whereas FIG. 8B illustrates the SNR over a range of azimuth angles of −0.2 to +0.15 degrees. As can be seen from this comparison, the BS-IAA algorithm has adequate spatial resolution to identify the DoA for the targets positioned two degrees apart despite the reduced complexity compared to the full virtual array IAA algorithm. Note that the non-adaptive DAS beamforming algorithm lacks the spatial resolution to differentiate between these two different targets.

FIG. 9 illustrates a resolution vs. SNR graph corresponding to different beamforming algorithms, in accordance with an aspect of the disclosure. Again, data is provided for each separate algorithm as shown in Table 5 above. The resolution is defined in this example as a minimal spacing between the targets such that a difference of −10 dB is observed between them. As can be seen from FIG. 9, the BS-IAA algorithm sacrifices at most a quarter of a degree of resolution across a band of 70 dB of SNR compared to the full virtual array IAA algorithm, despite a significant reduction in complexity.

FIG. 10 illustrates a peak to maximum side lobe power ratio vs. SNR graph corresponding to different beamforming algorithms, in accordance with an aspect of the disclosure.

With reference to the graph shown in FIG. 10, the average ratio between the peak power to the maximal power of the side lobes is graphed as function of SNR. From FIG. 10 it can be seen that the peak-to-sidelobe ratio is limited to 60 dB for the non-adaptive DAS beamforming algorithm and the BS-IAA algorithms. This performance limit is a result of the sidelobes associated with the Chebyshev window, which is a 60 dB window in this example. The BS-IAA algorithm provides a robust solution, however, that nearly tracks the performance of the full virtual array IAA algorithm.

In summary, the BS-IAA algorithm aspects described in this Section provide similar accuracy in the peak estimation as an IAA algorithm applied on the full virtual array. In the regions in which peaks were not detected, the BS-IAA performs at least as well as non-adaptive DAS beamforming solutions. Thus, the BS-IAA aspects achieve a similar resolution compared to full virtual array IAA solutions, but with a significant reduction in complexity to do so (e.g. a factor of 5-10 depending on the array and algorithmic parameters).

Figure 11:
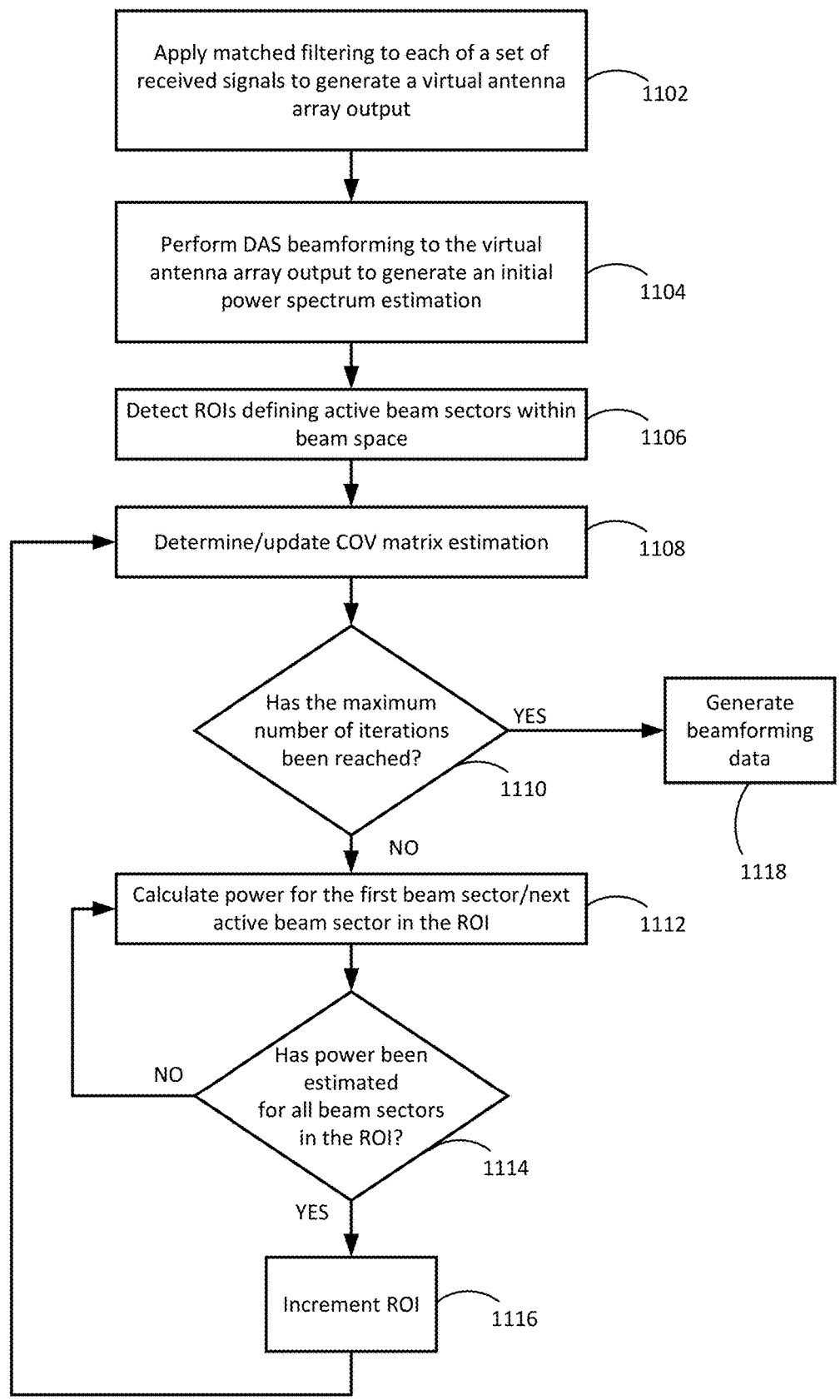
FIG. 11 illustrates a method flow associated with a beam space iterative adaptive approach (BS-IAA) algorithm, in accordance with an aspect of the disclosure.

FIG. 11 illustrates a method flow associated with a beam space iterative adaptive approach (BS-IAA) algorithm, in accordance with an aspect of the disclosure. With reference to FIG. 11, the method flow 1100 may be a computer-implemented method executed by and/or otherwise associated with one or more processors and/or storage devices. These processors and/or storage devices may be, for instance, associated with the device 600 as shown and described with reference to FIGS. 6A-6B, for example. In an aspect, the method flow 600 may be performed via one or more processors (e.g., processing circuitry 602 as shown in FIG. 6A) executing instructions stored on a suitable storage medium (e.g., a non-transitory computer-readable storage medium such as memory 604, as shown in FIG. 6A).

The method flow 1100 may begin by applying (block 1102) matched filtering to each of a set of received signals to generate a virtual antenna array output. This may include, for instance, the use of the matched filters as shown and described with reference to FIG. 6B, which produce a virtual array output to the DAS beamforming circuitry blocks 655.1-655.Nrx.

The method flow 1100 may continue by performing (block 1104) DAS beamforming to the virtual antenna array output to generate an initial power spectrum estimation with respect to the received signals. This may include, for instance, the use of the DAS beamforming algorithm as shown and described with reference to the DAS beamforming circuitry blocks 655.1-655.Nrx as shown in FIG. 6B. An example of this DAS beamforming algorithm is also shown and described with reference to Table 4A.

The method flow 1100 may continue by detecting (block 1106) ROIs using the initial power spectrum estimation with respect to the received signals. This may include, for instance, the use of the ROI detection algorithm as shown and described with reference to the ROI detection algorithm circuitry block 608 as shown in FIG. 6B and discussed in further detail with respect to Table 4B.

The method flow 1100 may continue by determining (block 1108) an initial COV matrix estimation using the initial power spectrum estimation with respect to the detected ROIs. This may include, for instance, the use of the IIA beamforming algorithm as shown and described with reference to the IAA algorithm circuitry block 609 as shown in FIG. 6B. Continuing this example, the IAA circuitry block 609 may also be implemented to perform the remaining steps of the method flow 1100 as shown in FIG. 11. As an example, the initial COV matrix estimation may be performed in accordance with the outer loop of the IAA algorithm as shown in Table 6C.

The method flow 100 may continue assuming that the maximum number of iterations has not been reached (block 1110—NO). In other words, the IAA algorithm may proceed as shown in Table 6C and continue to perform processing operations as discussed herein for a suitable number of iterations (e.g. 5).

Assuming that the maximum number of iterations is not reached, the method flow 1100 may continue to calculate (block 1112) power for the first beam sector within the first detected ROI (assuming more than one ROI is detected) by evaluating a number of power spectrum samples (e.g., 200). As an example, these power calculations may be performed in accordance with the two inner loops of the IAA algorithm as shown in Table 6C. Continuing this example, the method flow 1100 may continue to iteratively calculate, within the outer loop, the power for each identified ROI in beam space until the power has been estimated for all beam sectors in a detected ROI (block 1114—YES). Once the power is estimated for each beam sector within an ROI, then the method flow 11100 may include incrementing to the next ROI (block 1108) to update the initial power spectrum estimation (i.e. the COV matrix).

Thus, for each of the number of iterations, the method 100 functions to iteratively update the initial power estimation until a power estimation is performed for each of the active beam sectors associated with each of the one or more identified ROIs to generate the beamforming data (block 1118).

EXAMPLES

The following examples pertain to further aspects.

Example 1 is a method of performing beamforming, comprising: applying matched filtering to each of a plurality of received signals to generate a virtual antenna array output for a multiple-input multiple-output (MIMO) radar system; performing, using the virtual antenna array output, delay-and-sum (DAS) beamforming to generate an initial power spectrum estimation associated with the plurality of received signals; and generating beamforming data based on an iterative adaptive approach (IAA) that includes a number of iterations using the initial power spectrum estimation as an initial power estimation, and iteratively updating and evaluating the initial power estimation in one of a plurality of different beam directions.

In Example 2, the subject matter of Example 1, wherein the MIMO radar system includes a number of transmit antennas Ntx, and a number of receive antennas Nrx, and wherein the virtual antenna array output has a size equal to a multiplication of the number of transmit antennas and the number or receive antennas (Ntx)(Nrx).

In Example 3, the subject matter of any combination of Examples 1-2, wherein the initial power spectrum estimation comprises a size equal to the number of receive antennas Nrx.

In Example 4, the subject matter of any combination of Examples 1-3, wherein generating the beamforming data includes initially estimating a covariance (COV) matrix using the initial power spectrum estimation, and iteratively re-estimating the COV matrix as the initial power estimation is iteratively updated and evaluated.

In Example 5, the subject matter of any combination of Examples 1-4, wherein generating the beamforming data includes, for each of the number of iterations, updating and evaluating the initial power estimation in one of the plurality of different beam directions over a predetermined number of spectrum samples.

In Example 6, the subject matter of any combination of Examples 1-5, wherein generating the beamforming data includes repeating updating and evaluating the initial power estimation for each one of the plurality of different beam directions for each of the plurality of different beam directions.

Example 7 is a non-transitory computer-readable media having instructions stored thereon that, when executed by one or more processors, cause the one or more processors to perform beamforming by: applying matched filtering to each of a plurality of received signals to generate a virtual antenna array output for a multiple-input multiple-output (MIMO) radar system; performing, using the virtual antenna array output, delay-and-sum (DAS) beamforming to generate an initial power spectrum estimation associated with the plurality of received signals; and generating beamforming data based on an iterative adaptive approach (IAA) for a number of iterations using the initial power spectrum estimation as an initial power estimation, and evaluating the initial power estimation in one of a plurality of different beam directions.

In Example 8, the subject matter of Example 7, wherein the MIMO radar system includes a number of transmit antennas Ntx, and a number of receive antennas Nrx, and wherein the virtual antenna array output has a size equal to a multiplication of the number of transmit antennas and the number of receive antennas (Ntx)(Nrx).

In Example 9, the subject matter of any combination of Examples 7-8, wherein the initial power spectrum estimation comprises a size equal to the number of receive antennas Nrx.

In Example 10, the subject matter of any combination of Examples 7-9, wherein the instructions further cause the one or more processors to generate the beamforming data by initially estimating a covariance (COV) matrix using the initial power spectrum estimation, and iteratively re-estimating the COV matrix as the initial power estimation is iteratively updated and evaluated.

In Example 11, the subject matter of any combination of Examples 7-10, wherein the instructions further cause the one or more processors to generate the beamforming data by, for each of the number of iterations, updating and evaluating the initial power estimation in one of the plurality of different beam directions over a predetermined number of spectrum samples.

In Example 12, the subject matter of any combination of Examples 7-11, wherein the instructions further cause the one or more processors to generate the beamforming data by repeating the updating and evaluating of the initial power estimation for each one of the plurality of different beam directions for each of the plurality of different beam directions.

Example 13 is a method of performing beamforming, comprising: applying matched filtering to each of a plurality of received signals to generate a virtual antenna array output for a multiple-input multiple-output (MIMO) radar system; performing, using the virtual antenna array output, delay-and-sum (DAS) beamforming to generate an initial power spectrum estimation associated with the plurality of received signals; identifying one or more regions of interest (ROIs) in beam space using the initial power spectrum estimation, the one or more ROIs including one or more beam sectors associated with a detected target based upon a beam power exceeding a detection threshold value; and generating beamforming data based on an iterative adaptive approach by using, for each identified ROI from among the one or more identified ROIs, the initial power spectrum estimation as an initial power estimation in beam space and, for each of a number of iterations for each ROI, iteratively updating the initial power estimation until a power estimation is performed for each active beam sector associated with each of the one or more identified ROIs.

In Example 14, the subject matter of Example 13, wherein the act of identifying the one or more ROIs includes an ordered-statistic constant false-alarm rate (OS-CFAR) detection.

In Example 15, the subject matter of any combination of Examples 13-14, wherein each one of the one or more ROIs is based upon a region in beam space formed around a portion of a respective beam having a power that exceeds the detection threshold value.

In Example 16, the subject matter of any combination of Examples 13-15, wherein each one of the one or more ROIs has a respective beam width that is based upon a beam pattern generated as a result of the DAS beamforming.

In Example 17, the subject matter of any combination of Examples 13-16, wherein the MIMO radar system includes a number of transmit antennas Ntx, and a number of receive antennas Nrx, and wherein the virtual antenna array output has a size equal to a multiplication of the number of receive antennas by the number of transmit antennas (Ntx)(Nrx).

In Example 18, the subject matter of any combination of Examples 13-17, wherein the initial power spectrum estimation comprises a size equal to the number of receive antennas Nrx.

Example 19 is a non-transitory computer-readable media having instructions stored thereon that, when executed by one or more processors, cause the one or more processors to perform beamforming by: applying matched filtering to each of a plurality of received signals to generate a virtual antenna array output for a multiple-input multiple-output (MIMO) radar system; performing, using the virtual antenna array output, delay-and-sum (DAS) beamforming to generate an initial power spectrum estimation associated with the plurality of received signals; identifying one or more regions of interest (ROIs) in beam space using the initial power spectrum estimation, the one or more ROIs including one or more beam sectors associated with a detected target based upon a beam power exceeding a detection threshold value; and generating beamforming data based on an iterative adaptive approach (IAA) approach using, for each identified ROI from among the one or more identified ROIs, the initial power spectrum estimation as an initial power estimation in beam space and, for each of a number of iterations for each ROI, iteratively updating the initial power estimation until a power estimation is performed for each of active beam sector associated with each of the one or more identified ROIs.

In Example 20, the subject matter of Example 19, wherein the instructions further cause the one or more processors to identify the one or more ROIs using an ordered-statistic constant false-alarm rate (OS-CFAR) detection.

In Example 21, the subject matter of any combination of Examples 19-20, wherein the instructions further cause the one or more processors to identify the one or more ROIs based upon a region in beam space formed around a portion of a respective beam having a power that exceeds the detection threshold value.

In Example 22, the subject matter of any combination of Examples 19-21, wherein the instructions further cause the one or more processors to identify the one or more ROIs having a respective beam width that is based upon a beam pattern generated as a result of the DAS beamforming.

In Example 23, the subject matter of any combination of Examples 19-22, wherein the MIMO radar system includes a number of transmit antennas Ntx, and a number of receive antennas Nrx, and wherein the virtual antenna array output has a size equal to multiplication of the number of receive antennas by the number of transmit antennas (Ntx)(Nrx).

In Example 24, the subject matter of any combination of Examples 19-23, wherein the initial power spectrum estimation comprises a size equal to the number of receive antennas Nrx.

Example 25 is a method of performing beamforming, comprising: applying matched filtering means to each of a plurality of received signals to generate a virtual antenna array output for a multiple-input multiple-output (MIMO) radar system means; performing, using the virtual antenna array output, delay-and-sum (DAS) beamforming means to generate an initial power spectrum estimation associated with the plurality of received signals; and generating beamforming data based on an iterative adaptive approach (IAA) that includes a number of iterations using the initial power spectrum estimation as an initial power estimation, and iteratively updating and evaluating the initial power estimation in one of a plurality of different beam directions.

In Example 26, the subject matter of Example 25, wherein the MIMO radar system means includes a number of transmit antennas Ntx, and a number of receive antennas Nrx, and wherein the virtual antenna array output has a size equal to a multiplication of the number of transmit antennas and the number or receive antennas (Ntx)(Nrx).

In Example 27, the subject matter of any combination of Examples 25-26, wherein the initial power spectrum estimation comprises a size equal to the number of receive antennas Nrx.

In Example 28, the subject matter of any combination of Examples 25-27, wherein generating the beamforming data includes initially estimating a covariance (COV) matrix using the initial power spectrum estimation, and iteratively re-estimating the COV matrix as the initial power estimation is iteratively updated and evaluated.

In Example 29, the subject matter of any combination of Examples 25-28, wherein generating the beamforming data includes, for each of the number of iterations, updating and evaluating the initial power estimation in one of the plurality of different beam directions over a predetermined number of spectrum samples.

In Example 30, the subject matter of any combination of Examples 25-29, wherein generating the beamforming data includes repeating updating and evaluating the initial power estimation for each one of the plurality of different beam directions for each of the plurality of different beam directions.

Example 31 is a non-transitory computer-readable means having instructions stored thereon that, when executed by one or more processor means, cause the one or more processor means to perform beamforming by: applying matched filtering means to each of a plurality of received signals to generate a virtual antenna array output for a multiple-input multiple-output (MIMO) radar system means; performing, using the virtual antenna array output, delay-and-sum (DAS) beamforming means to generate an initial power spectrum estimation associated with the plurality of received signals; and generating beamforming data based on an iterative adaptive approach (IAA) for a number of iterations using the initial power spectrum estimation as an initial power estimation, and evaluating the initial power estimation in one of a plurality of different beam directions.

In Example 32, the subject matter of Example 31, wherein the MIMO radar system means includes a number of transmit antennas Ntx, and a number of receive antennas Nrx, and wherein the virtual antenna array output has a size equal to a multiplication of the number of transmit antennas and the number of receive antennas (Ntx)(Nrx).

In Example 33, the subject matter of any combination of Examples 31-32, wherein the initial power spectrum estimation comprises a size equal to the number of receive antennas Nrx.

In Example 34, the subject matter of any combination of Examples 31-33, wherein the instructions further cause the one or more processor means to generate the beamforming data by initially estimating a covariance (COV) matrix using the initial power spectrum estimation, and iteratively re-estimating the COV matrix as the initial power estimation is iteratively updated and evaluated.

In Example 35, the subject matter of any combination of Examples 31-34, wherein the instructions further cause the one or more processor means to generate the beamforming data by, for each of the number of iterations, updating and evaluating the initial power estimation in one of the plurality of different beam directions over a predetermined number of spectrum samples.

In Example 36, the subject matter of any combination of Examples 31-35, wherein the instructions further cause the one or more processor means to generate the beamforming data by repeating the updating and evaluating of the initial power estimation for each one of the plurality of different beam directions for each of the plurality of different beam directions.

Example 37 is a method of performing beamforming, comprising: applying matched filtering means to each of a plurality of received signals to generate a virtual antenna array output for a multiple-input multiple-output (MIMO) radar system means; performing, using the virtual antenna array output, delay-and-sum (DAS) beamforming means to generate an initial power spectrum estimation associated with the plurality of received signals; identifying one or more regions of interest (ROIs) in beam space using the initial power spectrum estimation, the one or more ROIs including one or more beam sectors associated with a detected target based upon a beam power exceeding a detection threshold value; and generating beamforming data based on an iterative adaptive approach by using, for each identified ROI from among the one or more identified ROIs, the initial power spectrum estimation as an initial power estimation in beam space and, for each of a number of iterations for each ROI, iteratively updating the initial power estimation until a power estimation is performed for each active beam sector associated with each of the one or more identified ROIs.

In Example 38, the subject matter of Example 37, wherein the act of identifying the one or more ROIs includes an ordered-statistic constant false-alarm rate (OS-CFAR) detection.

In Example 39, the subject matter of any combination of Examples 37-38, wherein each one of the one or more ROIs is based upon a region in beam space formed around a portion of a respective beam having a power that exceeds the detection threshold value.

In Example 40, the subject matter of any combination of Examples 37-39, wherein each one of the one or more ROIs has a respective beam width that is based upon a beam pattern generated as a result of the DAS beamforming.

In Example 41, the subject matter of any combination of Examples 37-40, wherein the MIMO radar system means includes a number of transmit antennas Ntx, and a number of receive antennas Nrx, and wherein the virtual antenna array output has a size equal to a multiplication of the number of receive antennas by the number of transmit antennas (Ntx)(Nrx).

In Example 42, the subject matter of any combination of Examples 37-41, wherein the initial power spectrum estimation comprises a size equal to the number of receive antennas Nrx.

Example 43 is a non-transitory computer-readable media means having instructions stored thereon that, when executed by one or more processor means, cause the one or more processor means to perform beamforming by: applying matched filtering means to each of a plurality of received signals to generate a virtual antenna array output for a multiple-input multiple-output (MIMO) radar system; performing, using the virtual antenna array output, delay-and-sum (DAS) beamforming means to generate an initial power spectrum estimation associated with the plurality of received signals; identifying one or more regions of interest (ROIs) in beam space using the initial power spectrum estimation, the one or more ROIs including one or more beam sectors associated with a detected target based upon a beam power exceeding a detection threshold value; and generating beamforming data based on an iterative adaptive approach (IAA) approach using, for each identified ROI from among the one or more identified ROIs, the initial power spectrum estimation as an initial power estimation in beam space and, for each of a number of iterations for each ROI, iteratively updating the initial power estimation until a power estimation is performed for each of active beam sector associated with each of the one or more identified ROIs.

In Example 44, the subject matter of Example 43, wherein the instructions further cause the one or more processor means to identify the one or more ROIs using an ordered-statistic constant false-alarm rate (OS-CFAR) detection.

In Example 45, the subject matter of any combination of Examples 43-44, wherein the instructions further cause the one or more processor means to identify the one or more ROIs based upon a region in beam space formed around a portion of a respective beam having a power that exceeds the detection threshold value.

In Example 46, the subject matter of any combination of Examples 43-45, wherein the instructions further cause the one or more processor means to identify the one or more ROIs having a respective beam width that is based upon a beam pattern generated as a result of the DAS beamforming.

In Example 47, the subject matter of any combination of Examples 43-46, wherein the MIMO radar system means includes a number of transmit antennas Ntx, and a number of receive antennas Nrx, and wherein the virtual antenna array output has a size equal to multiplication of the number of receive antennas by the number of transmit antennas (Ntx)(Nrx).

In Example 48, the subject matter of any combination of Examples 43-47, wherein the initial power spectrum estimation comprises a size equal to the number of receive antennas Nrx.

An apparatus as shown and described.
A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A method of performing beamforming, comprising:
    applying matched filtering to each of a plurality of received signals to generate a partial virtual antenna array output for a multiple-input multiple-output (MIMO) radar system including a number of transmit antennas Ntx and a number of receive antennas Nrx;
    performing, using the partial virtual antenna array output, delay-and-sum (DAS) beamforming to generate a number of DAS beamforming outputs that represents an initial power spectrum estimation associated with the plurality of received signals, the number of DAS beamforming outputs having a size equal to the number of receive antennas Nrx; and
    generating beamforming data based on an iterative adaptive approach (IAA) that includes a number of iterations using the initial power spectrum estimation as an initial power estimation, and iteratively updating and evaluating the initial power estimation for each one of a plurality of different beam directions until a predetermined threshold number of iterations is reached,
    wherein each one of the number of receive antennas is coupled to a respective one of a number of matched filters equal to the number of transmit antennas Ntx, and
    wherein applying the matched filtering to each of the plurality of the received signals to generate the partial virtual antenna array comprises applying, for each one of the number of receive antennas, the matched filtering via the respective number of matched filters such that the partial virtual antenna array output has a size equal to a multiplication of the number of transmit antennas and the number of receive antennas (Ntx)(Nrx).

2. The method of claim 1, wherein generating the beamforming data includes initially estimating a covariance (COV) matrix using the initial power spectrum estimation, and iteratively re-estimating the COV matrix as the initial power estimation is iteratively updated and evaluated.

3. The method of claim 1, wherein generating the beamforming data includes, for each of the number of iterations, updating and evaluating the initial power estimation in one of the plurality of different beam directions over a predetermined number of spectrum samples.

4. The method of claim 1, wherein generating the beamforming data includes repeating updating and evaluating the initial power estimation for each one of the plurality of different beam directions.

5. A non-transitory computer-readable media having instructions stored thereon that, when executed by one or more processors, cause the one or more processors to perform beamforming by:
    applying matched filtering to each of a plurality of received signals to generate a partial virtual antenna array output for a multiple-input multiple-output (MIMO) radar system including a number of transmit antennas Ntx and a number of receive antennas Nrx;

performing, using the partial virtual antenna array output, delay-and-sum (DAS) beamforming to generate a number of DAS beamforming outputs that represents an initial power spectrum estimation associated with the plurality of received signals, the number of DAS beamforming outputs having a size equal to the number of receive antennas Nr; and generating beamforming data based on an iterative adaptive approach (IAA) for a number of iterations using the initial power spectrum estimation as an initial power estimation, and evaluating the initial power estimation for each one of a plurality of different beam directions until a predetermined threshold number of iterations is reached, wherein each one of the number of receive antennas is coupled to a respective one of a number of matched filters equal to the number of transmit antennas Ntx, and wherein applying the matched filtering to each of the plurality of the received signals to generate the partial virtual antenna array comprises applying, for each one of the number of receive antennas, the matched filtering via the respective number of matched filters such that the partial virtual antenna array output has a size equal to a multiplication of the number of transmit antennas and the number of receive antennas (Ntx)(Nrx).

6. The non-transitory computer-readable media of claim 5, wherein the instructions further cause the one or more processors to generate the beamforming data by initially estimating a covariance (COV) matrix using the initial power spectrum estimation, and iteratively re-estimating the COV matrix as the initial power estimation is iteratively updated and evaluated.

7. The non-transitory computer-readable media of claim 5, wherein the instructions further cause the one or more processors to generate the beamforming data by, for each of the number of iterations, updating and evaluating the initial power estimation in one of the plurality of different beam directions over a predetermined number of spectrum samples.

8. The non-transitory computer-readable media of claim 5, wherein the instructions further cause the one or more processors to generate the beamforming data by repeating the updating and evaluating of the initial power estimation for each one of the plurality of different beam directions.

9. A method of performing beamforming, comprising:
applying matched filtering to each of a plurality of received signals to generate a virtual antenna array output for a multiple-input multiple-output (MIMO) radar system;
performing, using the virtual antenna array output, delay-and-sum (DAS) beamforming to generate an initial power spectrum estimation associated with the plurality of received signals;
identifying one or more regions of interest (ROIs) in beam space using the initial power spectrum estimation, the one or more ROIs including one or more beam sectors associated with a detected target based upon a beam power exceeding a detection threshold value; and
generating beamforming data based on an iterative adaptive approach (IAA) by using, for each identified ROI from among the one or more identified ROIs, the initial power spectrum estimation as an initial power estimation in beam space and, for each of a number of iterations for each ROI, iteratively updating the initial power estimation until a power estimation is performed for each active beam sector associated with each of the one or more identified ROIs.

10. The method of claim 9, wherein the act of identifying the one or more ROIs includes an ordered-statistic constant false-alarm rate (OS-CFAR) detection.

11. The method of claim 9, wherein each one of the one or more ROIs is based upon a region in beam space formed around a portion of a respective beam having a power that exceeds the detection threshold value.

12. The method of claim 9, wherein each one of the one or more ROIs has a respective beam width that is based upon a beam pattern generated as a result of the DAS beamforming.

13. The method of claim 9, wherein the MIMO radar system includes a number of transmit antennas Ntx, and a number of receive antennas Nrx, and wherein the virtual antenna array output has a size equal to a multiplication of the number of receive antennas by the number of transmit antennas (Ntx)(Nrx).

14. The method of claim 13, wherein the initial power spectrum estimation comprises a size equal to the number of receive antennas Nrx.

15. A non-transitory computer-readable media having instructions stored thereon that, when executed by one or more processors, cause the one or more processors to perform beamforming by:
applying matched filtering to each of a plurality of received signals to generate a virtual antenna array output for a multiple-input multiple-output (MIMO) radar system;
performing, using the virtual antenna array output, delay-and-sum (DAS) beamforming to generate an initial power spectrum estimation associated with the plurality of received signals;
identifying one or more regions of interest (ROIs) in beam space using the initial power spectrum estimation, the one or more ROIs including one or more beam sectors associated with a detected target based upon a beam power exceeding a detection threshold value; and
generating beamforming data based on an iterative adaptive approach (IAA) approach by using, for each identified ROI from among the one or more identified ROIs, the initial power spectrum estimation as an initial power estimation in beam space and, for each of a number of iterations for each ROI, iteratively updating the initial power estimation until a power estimation is performed for each of active beam sector associated with each of the one or more identified ROIs.

16. The non-transitory computer-readable media of claim 15, wherein the instructions further cause the one or more processors to identify the one or more ROIs using an ordered-statistic constant false-alarm rate (OS-CFAR) detection.

17. The non-transitory computer-readable media of claim 15, wherein the instructions further cause the one or more processors to identify the one or more ROIs based upon a region in beam space formed around a portion of a respective beam having a power that exceeds the detection threshold value.

18. The non-transitory computer-readable media of claim 15, wherein the instructions further cause the one or more processors to identify the one or more ROIs having a respective beam width that is based upon a beam pattern generated as a result of the DAS beamforming.

19. The non-transitory computer-readable media of claim 15, wherein the MIMO radar system includes a number of transmit antennas Ntx, and a number of receive antennas Nrx, and wherein the virtual antenna array output has a size equal to multiplication of the number of receive antennas by the number of transmit antennas (Ntx)(Nrx).

20. The non-transitory computer-readable media of claim 19, wherein the initial power spectrum estimation comprises a size equal to the number of receive antennas Nrx.

* * * * *